United States Patent
Yerramalli et al.

(10) Patent No.: US 12,032,083 B2
(45) Date of Patent: Jul. 9, 2024

(54) RECONFIGURABLE INTELLIGENT SURFACE ASSISTED RADIO FREQUENCY FINGERPRINTING FOR POSITIONING

(71) Applicant: QUALCOMM Incorporated, San Diego, CA (US)

(72) Inventors: Srinivas Yerramalli, San Diego, CA (US); Mohammed Ali Mohammed Hirzallah, San Diego, CA (US); Marwen Zorgui, San Diego, CA (US); Roohollah Amiri, San Diego, CA (US); Rajat Prakash, San Diego, CA (US); Taesang Yoo, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 142 days.

(21) Appl. No.: 17/587,247

(22) Filed: Jan. 28, 2022

(65) Prior Publication Data

US 2023/0243915 A1    Aug. 3, 2023

(51) Int. Cl.
*G01S 5/02*    (2010.01)
*H04W 4/029*    (2018.01)
*H04W 24/08*    (2009.01)

(52) U.S. Cl.
CPC ......... *G01S 5/02521* (2020.05); *H04W 4/029* (2018.02); *H04W 24/08* (2013.01)

(58) Field of Classification Search
None
See application file for complete search history.

(56) References Cited

FOREIGN PATENT DOCUMENTS

WO    WO-2023036448 A1 *    3/2023

OTHER PUBLICATIONS

International Search Report and Written Opinion—PCT/US2022/080585—ISA/EPO—Mar. 21, 2023.
Rajendran S., et al., "Injecting Reliable Radio Frequency Fingerprints Using Metasurface for the Internet of Things", IEEE Transactions on Information Forensics and Security, USA, vol. 16, Dec. 16, 2020, pp. 1896-1911, XP011830149, ISSN: 1556-6013, DOI: 10.1109/TIFS.2020.3045318, p. 2, line 1-p. 14, Left-hand Column, Last Line.
Zhu X., et al., "Indoor Intelligent Fingerprint-Based Localization: Principles, Approaches and Challenges", IEEE Communications Surveys & Tutorials, USA, vol. 22, No. 4, Aug. 5, 2020, pp. 2634-2657, XP011821372, DOI: 10.1109/COMST.2020.3014304, p. 2636, Right-hand Column, Line 3-p. 2653, Left-hand Column, Line 12.

* cited by examiner

*Primary Examiner* — Adolf Dsouza
(74) *Attorney, Agent, or Firm* — Thien T. Nguyen

(57) ABSTRACT

Disclosed are techniques for wireless positioning. In an aspect, a network entity, such as a location server, may determine information characterizing a channel associated with a wireless device within a region of interest. The network entity may determine a location of the wireless device within the region of interest based on that information and a set of radio frequency fingerprints (RFFPs), where each RFFP identifies a geographic location within a region of interest and a channel condition at that geographic location within the region of interest, and where each geographic location within the region of interest is represented by a set of RFFPs having different channel conditions due to different states of at least one reconfigurable intelligent surface (RIS) within the region of interest.

32 Claims, 16 Drawing Sheets

RECONFIGURABLE INTELLIGENT SURFACE ASSISTED RADIO FREQUENCY FINGERPRINTING FOR POSITIONING

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide higher data rates as compared to previous standards, more accurate positioning (e.g., based on reference signals for positioning (RS-P), such as downlink, uplink, or sidelink positioning reference signals (PRS)), and other technical enhancements. These enhancements, as well as the use of higher frequency bands, advances in PRS processes and technology, and high-density deployments for 5G, enable highly accurate 5G-based positioning.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless positioning performed by a network entity includes determining first information characterizing at least one channel associated with a wireless device within a region of interest; and determining a location of the wireless device within the region of interest based on the first information characterizing the at least one channel associated with the wireless device and a plurality of radio frequency fingerprints (RFFPs), wherein each RFFP of the plurality of RFFPs identifies a geographic location within a region of interest and a channel condition at that geographic location within the region of interest, and wherein each geographic location within the region of interest is represented by a plurality of RFFPs having different channel conditions due to different states of at least one reconfigurable intelligent surface (RIS) within the region of interest.

In an aspect, a method of wireless positioning performed by a user equipment (UE) includes performing a measurement of a signal at a location within a region of interest and under a RIS configuration that specifies a configuration of at least one RIS in the region of interest; and sending, to a network entity, measurement information, the measurement information comprising a result of the measurement of the signal and information indicating the RIS configuration.

In an aspect, a network entity includes a memory; at least one transceiver; and at least one processor communicatively coupled to the memory and the at least one transceiver, the at least one processor configured to: determine first information characterizing at least one channel associated with a wireless device within a region of interest; and determine a location of the wireless device within the region of interest based on the first information characterizing the at least one channel associated with the wireless device and a plurality of RFFPs, wherein each RFFP of the plurality of RFFPs identifies a geographic location within a region of interest and a channel condition at that geographic location within the region of interest, and wherein each geographic location within the region of interest is represented by a plurality of RFFPs having different channel conditions due to different states of at least one RIS within the region of interest.

In an aspect, a UE includes a memory; at least one transceiver; and at least one processor communicatively coupled to the memory and the at least one transceiver, the at least one processor configured to: perform a measurement of a signal at a location within a region of interest and under a RIS configuration that specifies a configuration of at least one RIS in the region of interest; and send, via the at least one transceiver, to a network entity, measurement information, the measurement information comprising a result of the measurement of the signal and information indicating the RIS configuration.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
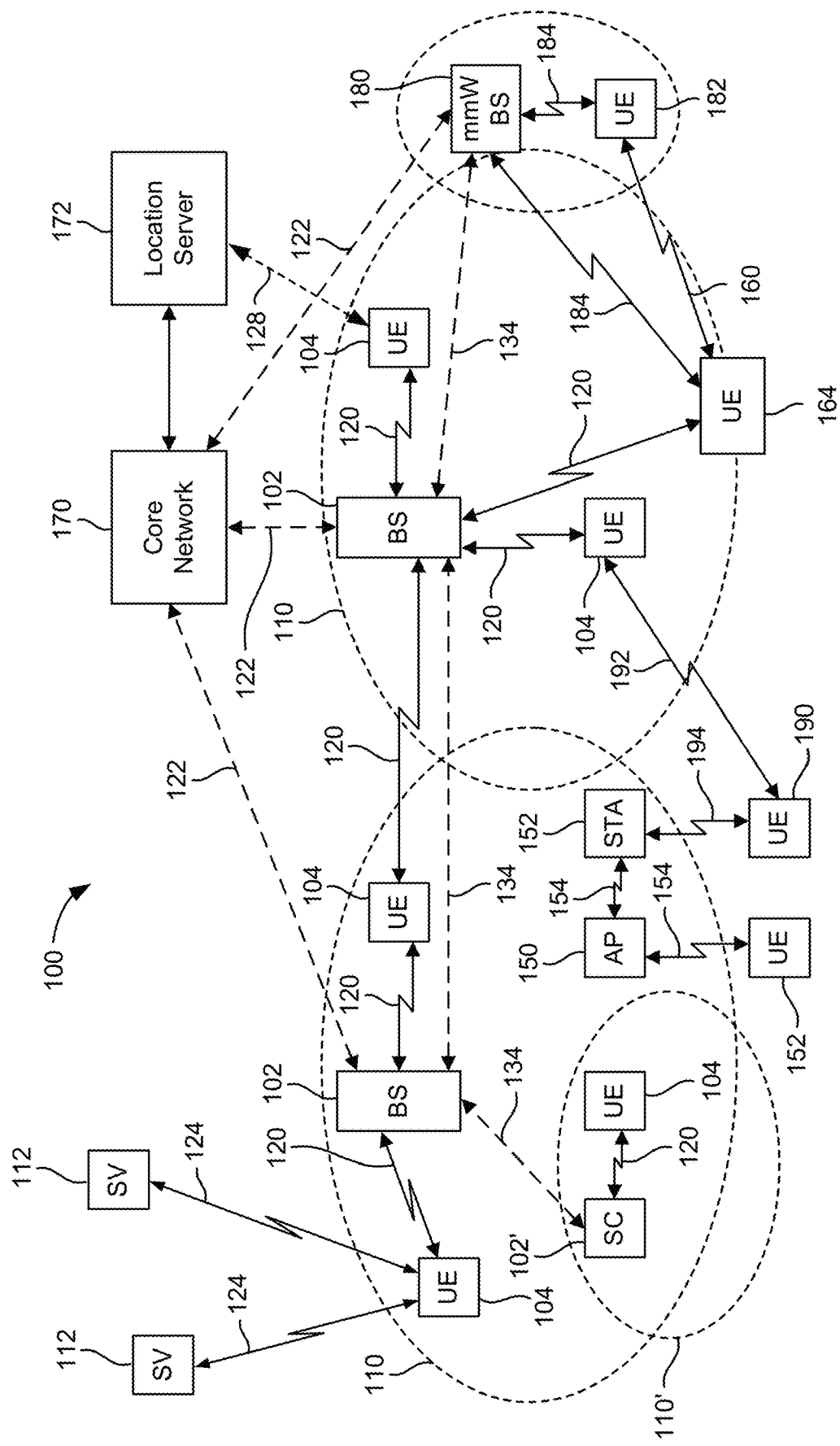
FIG. 1 illustrates an example wireless communications system, according to aspects of the disclosure.

Disclosed are techniques for wireless positioning. In an aspect, a network entity may determine first information characterizing at least one channel associated with a wireless device within a region of interest. The network entity may determine a location of the wireless device within the region of interest based on the first information characterizing the at least one channel associated with the wireless device and a plurality of radio frequency fingerprints (RFFPs), wherein each RFFP of the plurality of RFFPs identifies a geographic location within a region of interest and a channel condition at that geographic location within the region of interest, and wherein each geographic location within the region of interest is represented by a plurality of RFFPs having different channel conditions due to different states of at least one reconfigurable intelligent surface (RIS) within the region of interest. In another aspect, a user equipment (UE) may perform a measurement of a signal at a location within a region of interest and under a RIS configuration that specifies a configuration of at least one RIS in the region of interest, and send measurement information to the network entity, the measurement information comprising a result of the measurement of the signal and information indicating the RIS configuration.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen-before-talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more S Cells for the UE 164 and the mmW base station 180 may support one or more SCells for the UE 164.

In some cases, the UE 164 and the UE 182 may be capable of sidelink communication. Sidelink-capable UEs (SL-UEs) may communicate with base stations 102 over communication links 120 using the Uu interface (i.e., the air interface between a UE and a base station). SL-UEs (e.g., UE 164, UE 182) may also communicate directly with each other over a wireless sidelink 160 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, vehicle-to-vehicle (V2V) communication, vehicle-to-everything (V2X) communication (e.g., cellular V2X (cV2X) communication, enhanced V2X (eV2X) communication, etc.), emergency rescue applications, etc. One or more of a group of SL-UEs utilizing sidelink communications may be within the geographic coverage area 110 of a base station 102. Other SL-UEs in such a group may be outside the geographic coverage area 110 of a base station 102 or be otherwise unable to receive transmissions from a base station 102. In some cases, groups of SL-UEs communicating via sidelink communications may utilize a one-to-many (1:M) system in which each SL-UE transmits to every other SL-UE in the group. In some cases, a base station 102 facilitates the scheduling of resources for sidelink communications. In other cases, sidelink communications are carried out between SL-UEs without the involvement of a base station 102.

In an aspect, the sidelink 160 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs. In an aspect, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Note that although FIG. 1 only illustrates two of the UEs as SL-UEs (i.e., UEs 164 and 182), any of the illustrated UEs may be SL-UEs. Further, although only UE 182 was described as being capable of beamforming, any of the illustrated UEs, including UE 164, may be capable of beamforming. Where SL-UEs are capable of beamforming, they may beamform towards each other (i.e., towards other SL-UEs), towards other UEs (e.g., UEs 104), towards base stations (e.g., base stations 102, 180, small cell 102', access point 150), etc. Thus, in some cases, UEs 164 and 182 may utilize beamforming over sidelink 160.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
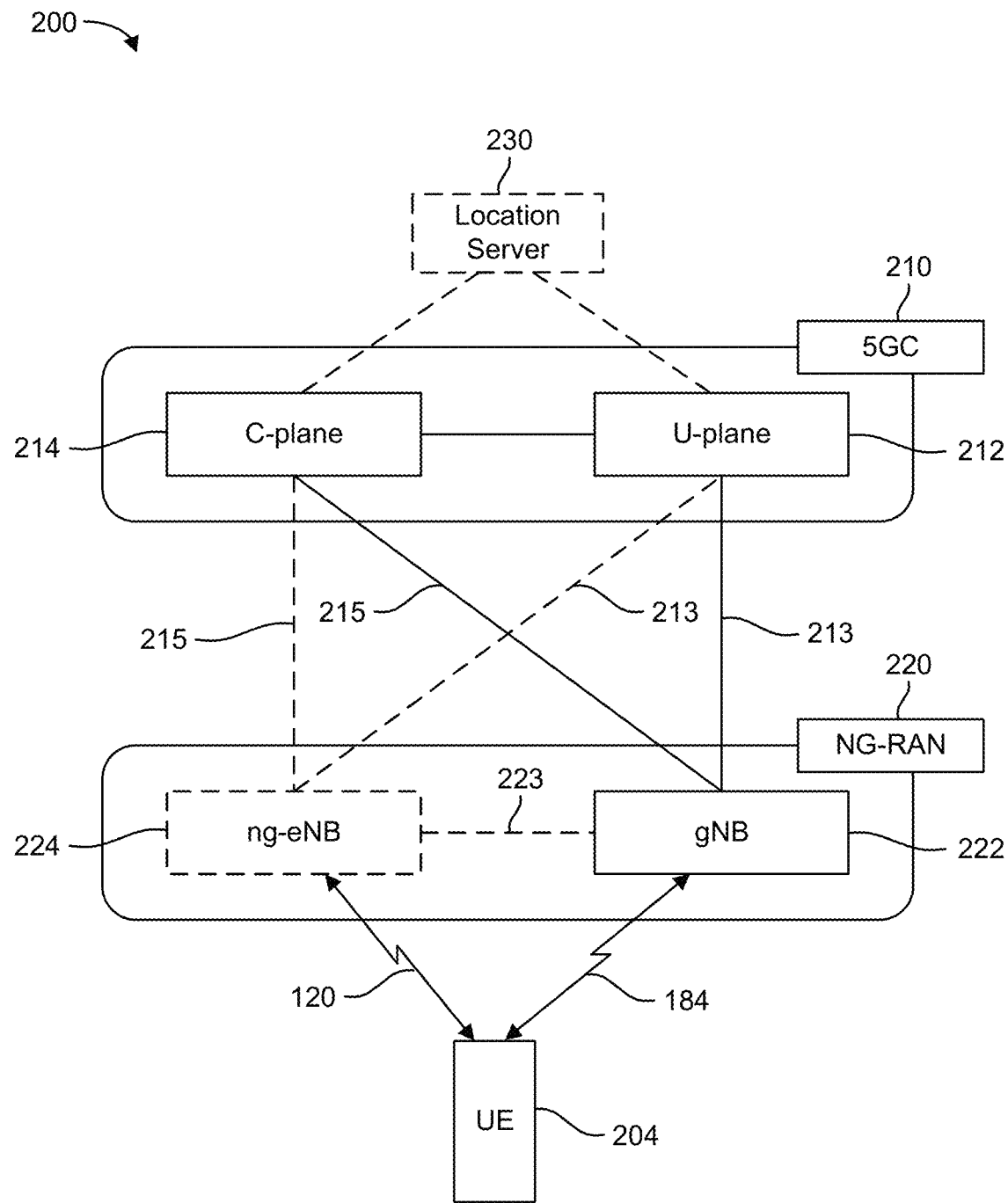
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
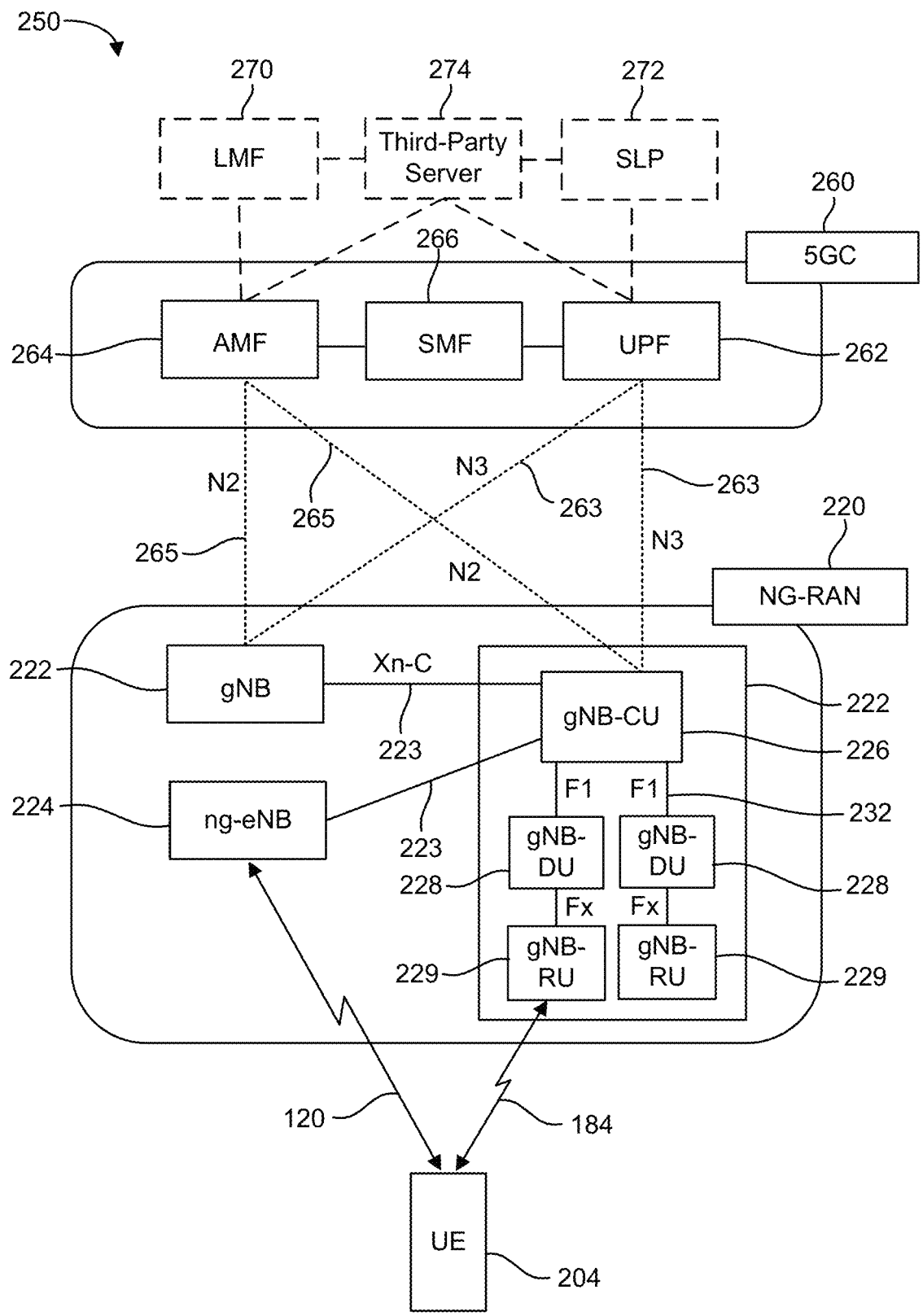

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface.

The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Figure 3A:
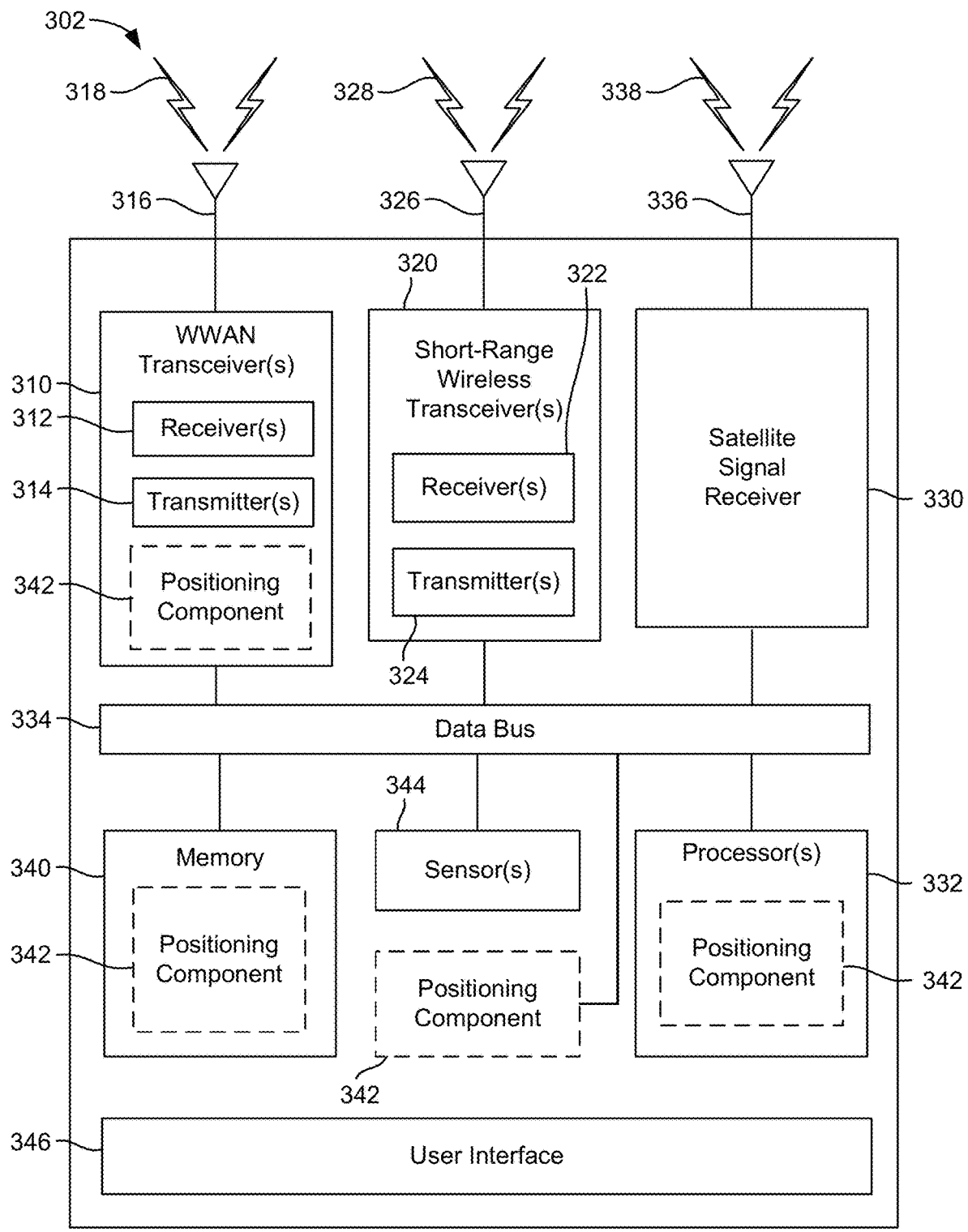
FIGS. 3A, 3B, and 3C are simplified block diagrams of several sample aspects of components that may be employed in a user equipment (UE), a base station, and a network entity, respectively, and configured to support communications as taught herein.
Figure 3B:
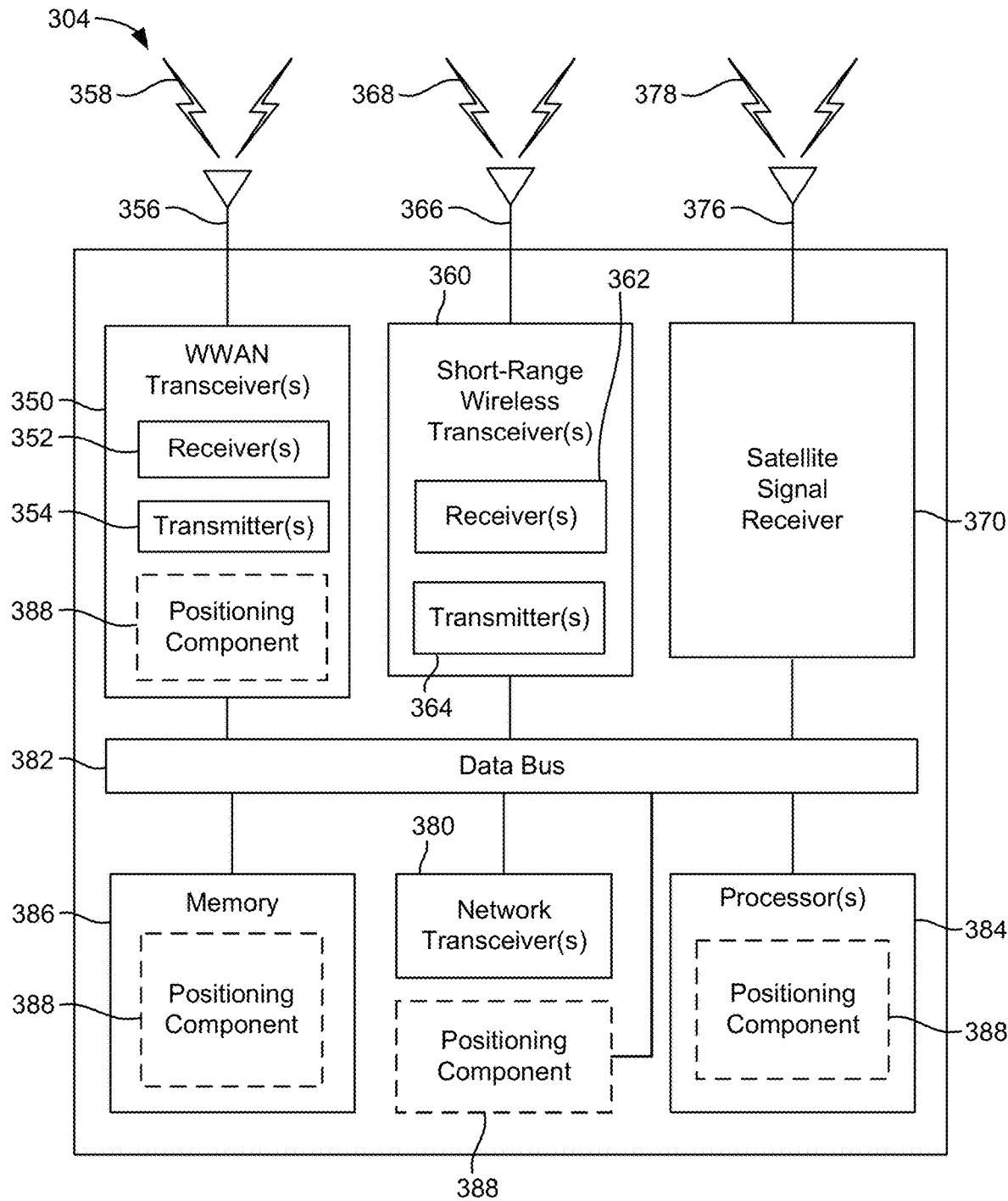
Figure 3C:
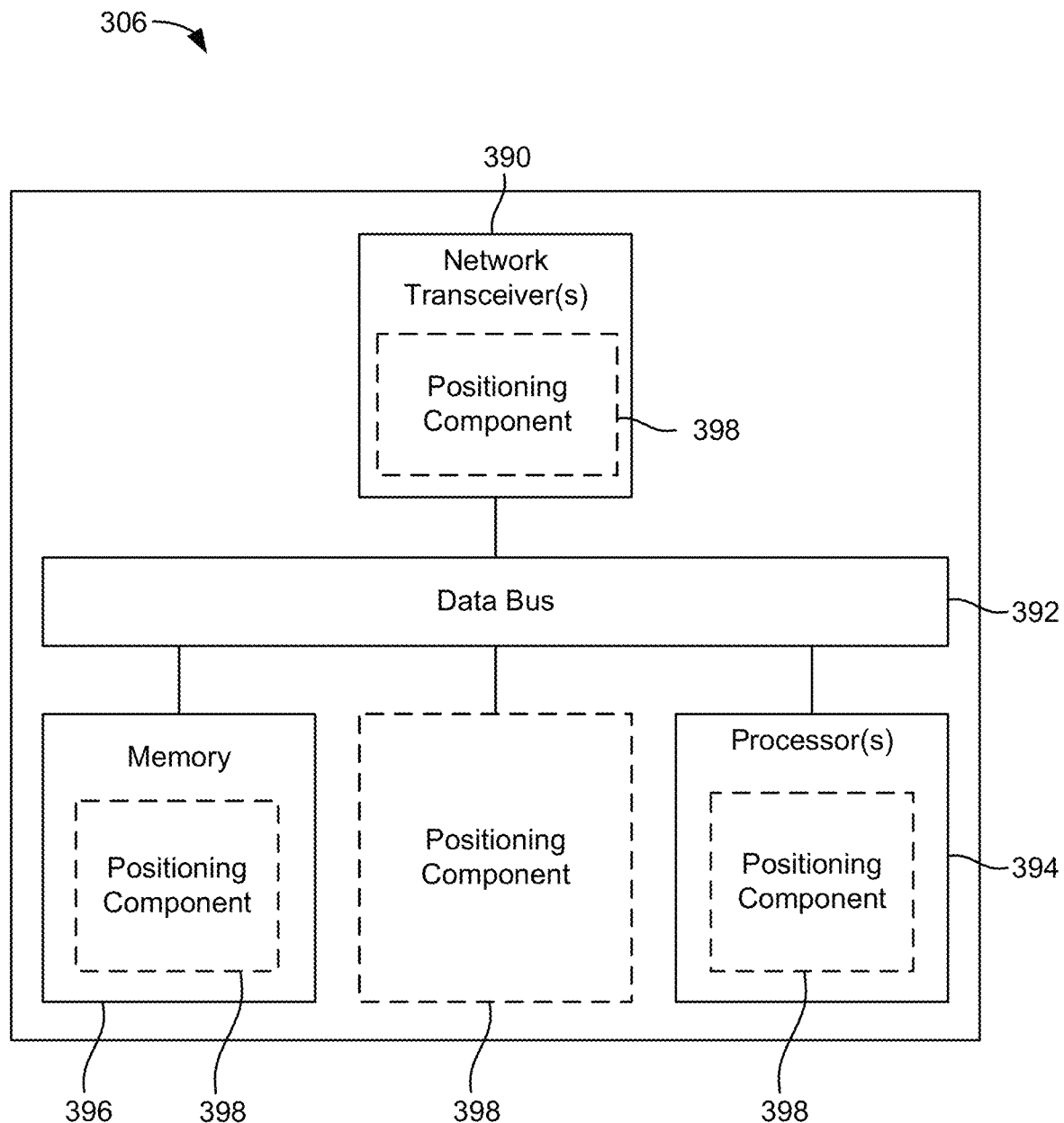

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the operations described herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include positioning component 342, 388, and 398, respectively. The positioning component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the positioning component 342, 388, and 398 may be external to the processors 332, 384, and 394 (e.g., part of a modem processing system, integrated with another processing system, etc.). Alternatively, the positioning component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the positioning component 342, which may be, for example, part of the one or more WWAN transceivers 310, the memory 340, the one or more processors 332, or any combination thereof, or may be a standalone component. FIG. 3B illustrates possible locations of the positioning component 388, which may be, for example, part of the one or more WWAN transceivers 350, the memory 386, the one or more processors 384, or any combination thereof, or may be a standalone component. FIG. 3C illustrates possible locations of the positioning component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the positioning component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

Figure 4:
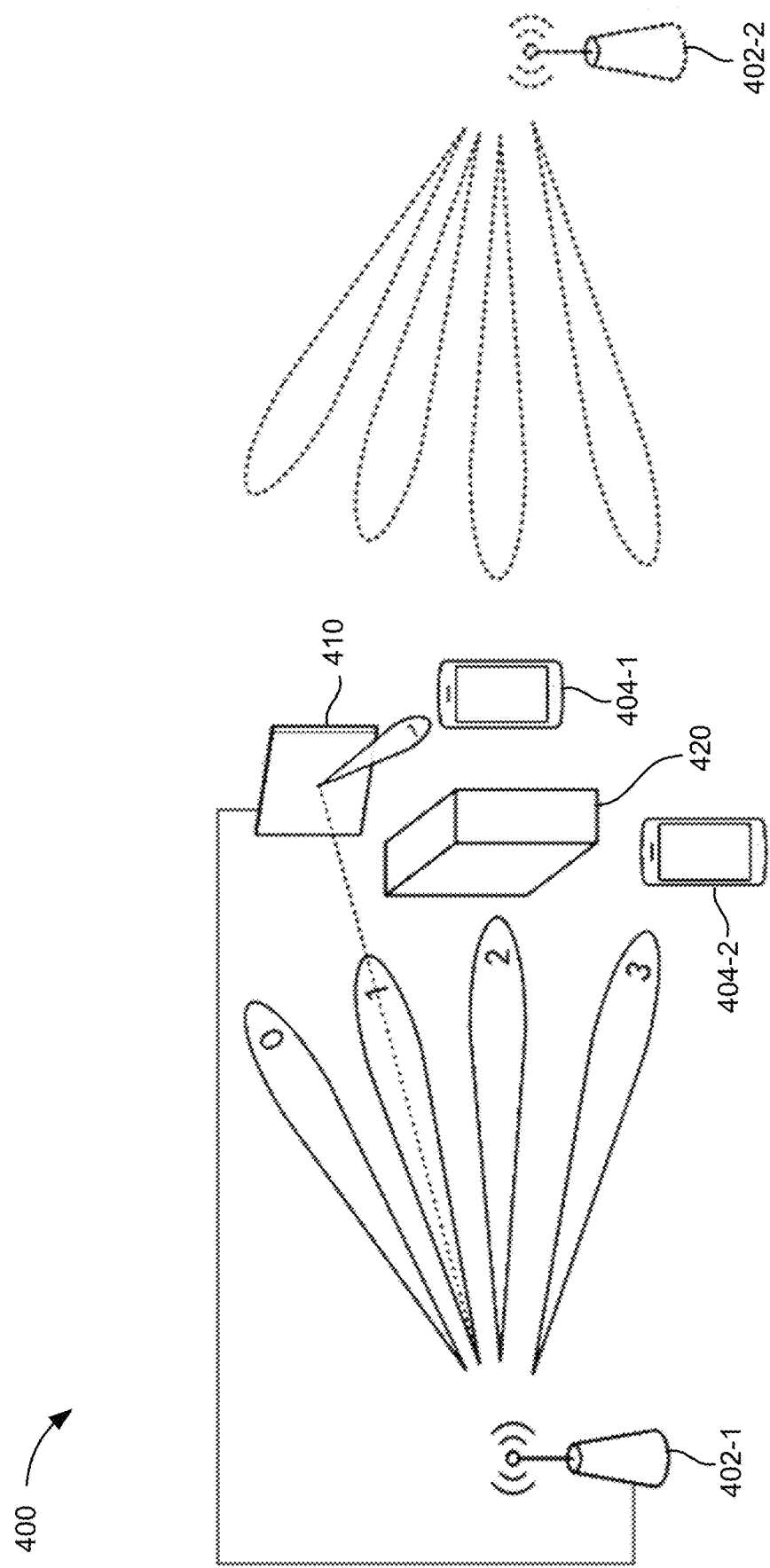
FIG. 4 illustrates an example system for wireless communication using a reconfigurable intelligent surface (RIS), according to aspects of the disclosure.

FIG. 4 illustrates an example system 400 for wireless communication using a reconfigurable intelligent surface (RIS) 410, according to aspects of the disclosure. A RIS is also commonly referred to as an intelligent reflecting surface (IRS). A RIS (e.g., RIS 410) is a two-dimensional surface comprising a large number of low-cost, low-power near-passive reflecting elements whose properties are not static but instead are reconfigurable (by software). For example, by carefully tuning the phase shifts of the reflecting elements (using software), the scattering, absorption, reflection, and diffraction properties of an RIS can be changed over time. In that way, the electromagnetic (EM) properties of an RIS can be engineered to collect wireless signals from a transmitter (e.g., a base station, a UE, etc.) and passively beamform them towards a target receiver (e.g., another base station, another UE, etc.). A RIS can reflect an impinging signal and thus effectively create a non-line-of-sight (NLOS) path, e.g., to overcome blockage, enhance coverage, create an opportunity for spatial multiplexing, or combinations thereof.

A RIS can be implemented as one of the following entities:
 Configurable mirror: based on incident angle, the reflective angle can be controlled, RF delays are minimal.
 Configurable mirror with minor configurable delay: in addition to configuring the reflective angle and gain, additional delay elements in the RIS hardware can impact transmission by a few nanoseconds (ns).
 Amplify and forward relay: a RIS with a baseband capability can receive the signal, delay it by several symbols and transmit it at a chosen time.

The base station controls and coordinates various aspects of the transmission, using some feedback from the UE, if needed. In the example of FIG. 4, a first base station 402-1 controls the reflective properties of an RIS 410 in order to communicate with a first UE 404-1.

The goal of RIS technology is to create smart radio environments, where the wireless propagation conditions are co-engineered with the physical layer signaling. This enhanced functionality of the system 400 can provide technical benefits in a number of scenarios.

As a first example scenario, as shown in FIG. 4, the first base station 402-1 (e.g., any of the base station described herein) is attempting to transmit downlink wireless signals to the first UE 404-1 and a second UE 404-2 (e.g., any two of the UEs described herein, collectively, UEs 404) on a plurality of downlink transmit beams, labeled "0," "1," "2," and "3." However, unlike the second UE 404-2, because the first UE 404-1 is behind an obstacle 420 (e.g., a building, a hill, or another type of obstacle), it cannot receive the wireless signal on what would otherwise be the line-of-sight (LOS) beam from the first base station 402-1, that is, the downlink transmit beam labeled "2." In this scenario, the first base station 402-1 may instead use the downlink transmit beam labeled "1" to transmit the wireless signal to the RIS 410, and configure the RIS 410 to reflect/beamform the incoming wireless signal towards the first UE 404-1. The first base station 402-1 can thereby transmit the wireless signal around the obstacle 420.

Note that the first base station 402-1 may also configure the RIS 410 for the first UE's 404-1 use in the uplink. In that case, the first base station 402-1 may configure the RIS 410 to reflect an uplink signal from the first UE 404-1 to the first base station 402-1, thereby enabling the first UE 404-1 to transmit the uplink signal around the obstacle 420.

As another example scenario in which system 400 can provide a technical advantage, the first base station 402-1 may be aware that the obstacle 420 may create a "dead zone," that is, a geographic area in which the downlink wireless signals from the first base station 402-1 are too attenuated to be reliably detected by a UE within that area (e.g., the first UE 404-1). In this scenario, the first base station 402-1 may configure the RIS 410 to reflect downlink wireless signals into the dead zone in order to provide coverage to UEs that may be located there, including UEs about which the first base station 402-1 is not aware.

An RIS (e.g., RIS 410) may be designed to operate in either a first mode (referred to as "Mode 1"), in which the RIS operates as a reconfigurable mirror, or a second mode (referred to as "Mode 2"), in which the RIS operates as a receiver and transmitter (similar to the amplify and forward functionality of a relay node). Some RIS may be designed to be able to operate in either Mode 1 or Mode 2, while other RIS may be designed to operate only in either Mode 1 or Mode 2. Mode 1 RIS are assumed to have a negligible hardware group delay, whereas Mode 2 RIS have a non-negligible hardware group delay due to being equipped with limited baseband processing capability. Because of their greater processing capability compared to Mode 1 RIS, Mode 2 RIS may, in some cases, be able to compute and report their transmission-to-reception (Tx-Rx) time difference measurements (i.e., the difference between the time a signal is reflected towards a UE and the time the signal is received back from the UE). In the example of FIG. 4, the RIS 410 may be either a Mode 1 or Mode 2 RIS.

FIG. 4 also illustrates a second base station 402-2 that may transmit downlink wireless signals to one or both of the UEs 404. As an example, the first base station 402-1 may be a serving base station for the UEs 404 and the second base station 402-2 may be a neighboring base station. The second base station 402-2 may transmit downlink positioning reference signals to one or both of the UEs 404 as part of a positioning procedure involving the UE(s) 404. Alternatively or additionally, the second base station 402-2 may be a secondary cell for one or both of the UEs 404. In some cases, the second base station 402-2 may also be able to reconfigure the RIS 410, provided it is not being controlled by the first base station 402-1 at the time.

Note that while FIG. 4 illustrates one RIS 410 and one base station controlling the RIS 410 (i.e., the first base station 402-1), the first base station 402-1 may control multiple RIS 410. In addition, the RIS 410 may be controlled by multiple base stations 402 (e.g., both the first base station 402-1 and second base station 402-2, and possibly more).

Figure 5:
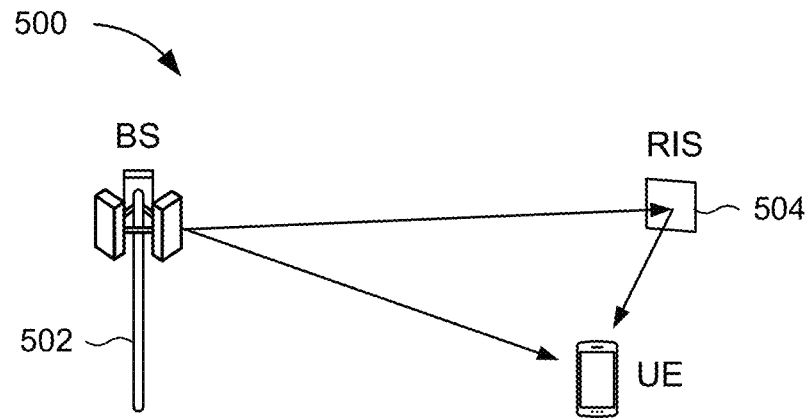
FIG. 5 illustrates a system having a single RIS, according to aspects of the disclosure.

FIG. 5 illustrates a system having a single RIS, according to aspects of the disclosure. In FIG. 5, system 500 includes a base station (BS) 502 and a single RIS 504. In the example shown in FIG. 5, the BS 502 is serving a UE 506. The system 500 may be characterized by the following equation:

$$\begin{bmatrix} y_1 \\ \vdots \\ y_{N_R} \end{bmatrix} = \left( \sum_{n=1}^{N_{RIS}} \begin{bmatrix} a_{1,n} \\ \vdots \\ a_{N_R,n} \end{bmatrix} C_n [b_{1,n} \ \ldots \ b_{N_T,n}] + \sum_k \begin{bmatrix} g_{1,k} \\ \vdots \\ g_{N_R,k} \end{bmatrix} [h_{1,k} \ \ldots \ h_{N_T,k}] \right) \begin{bmatrix} x_1 \\ \vdots \\ x_{N_T} \end{bmatrix}$$

where $N_T$, $N_R$, $N_{RIS}$=the number of antenna elements at the BS, the UE, and the RIS, respectively;

$C_n$=the channel gain due to the $n^{th}$ element of the RIS;

$a_{k,n}$=the channel from RIS element n to receive element k;

$b_{k,n}$=the channel from BS antenna k to RIS element n; and g and h model the direct transmission.

In the equation above, the portion between the parentheses represents the composite channel.

Figure 6:
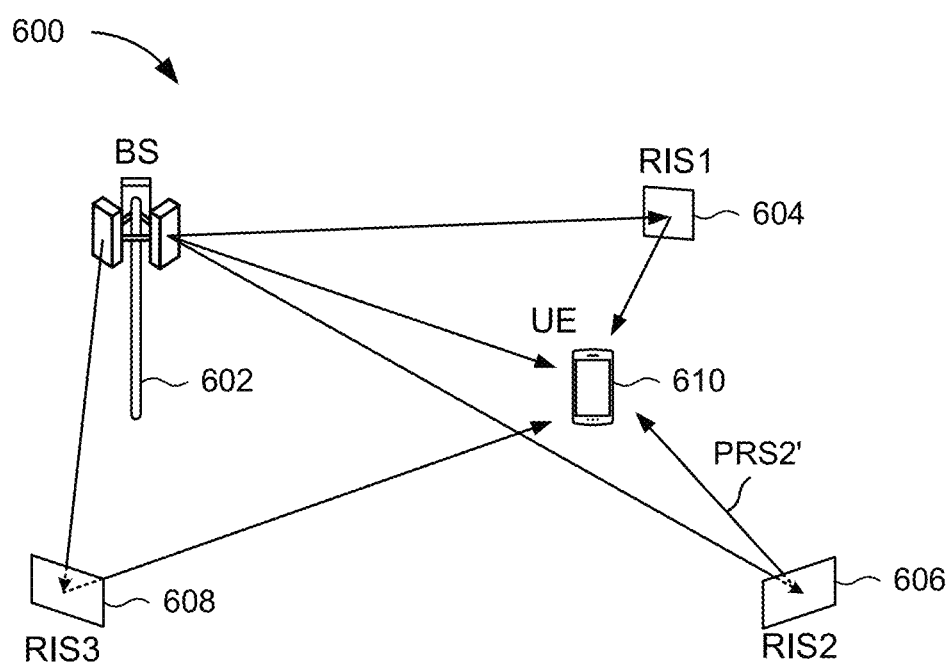
FIG. 6 illustrates a system having multiple RISes, according to aspects of the disclosure.

FIG. 6 illustrates a system having multiple RISes, according to aspects of the disclosure. In FIG. 6, system 600 includes a BS 602, and multiple RISes: RIS1 604, RIS2 606, and RIS3 608. In the example shown in FIG. 6, the BS 602 is serving a UE 610. The system 600 may be characterized by the following equation:

$$\begin{bmatrix} y_1 \\ \vdots \\ y_{N_R} \end{bmatrix} = \left( \sum_{l=1}^{L_{RIS}} \sum_{n=1}^{N_{RIS}} \begin{bmatrix} a_{1,n}^{(l)} \\ \vdots \\ a_{N_R,n}^{(l)} \end{bmatrix} C_n^{(l)} [b_{1,n}^{(l)} \ \ldots \ b_{N_T,n}^{(l)}] + $$

$$\sum_k \begin{bmatrix} g_{1,k} \\ \vdots \\ g_{N_R,k} \end{bmatrix} [h_{1,k} \ \ldots \ h_{N_T,k}] \right) \begin{bmatrix} x_1 \\ \vdots \\ x_{N_T} \end{bmatrix}$$

where $L_{RIS}$=the number of RISes in the system $N_T$, $N_R$, $N_{RIS}$=the number of antenna elements at the BS, the UE, and the RIS, respectively;

$c_n^{(l)}$=the channel gain due to the $n^{th}$ element of the $l^{th}$ RIS;

$a_{k,n}^{(l)}$=the channel from the $n^{th}$ element of the $l^{th}$ RIS to receive element k;

$b_{k,n}^{(l)}$=the channel from BS antenna k to the $n^{th}$ element of the $l^{th}$ RIS; and g and h model the direct transmission.

In the equation above, the portion between the parentheses represents the composite channel.

Radio frequency fingerprinting is a technique in which channel measurements are taken at known locations within a geographic region of interest (ROI) and stored in a database. Entries within the database store a precise geographic location—also referred to as a "ground truth location"—and the channel measured at that precise geographic location. Each location within the ROI will have a channel that is a function of several factors, such as that location's relative distance from one or more transmission/reception points (TRPs), the local terrain at that location, the environmental conditions, such as ambient noise and interference at that location, and other factors. Because each location will have a different set of conditions that affect the RF channel, each location is said to have its own unique RF "fingerprint". These RF fingerprints are stored in the RFFP database.

Figure 7A:
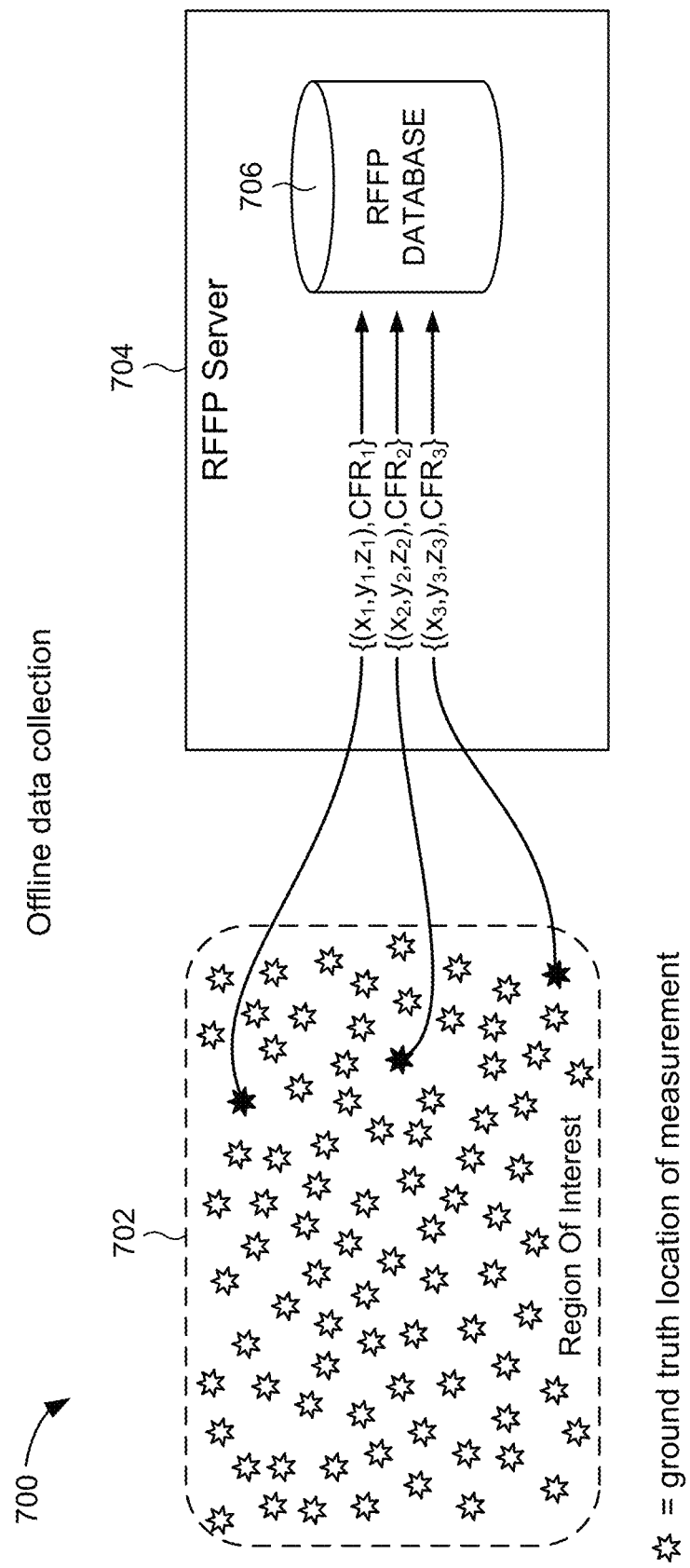
FIG. 7A and FIG. 7B illustrate portions of a conventional implementation of radio frequency fingerprinting (RFFP).
Figure 7B:
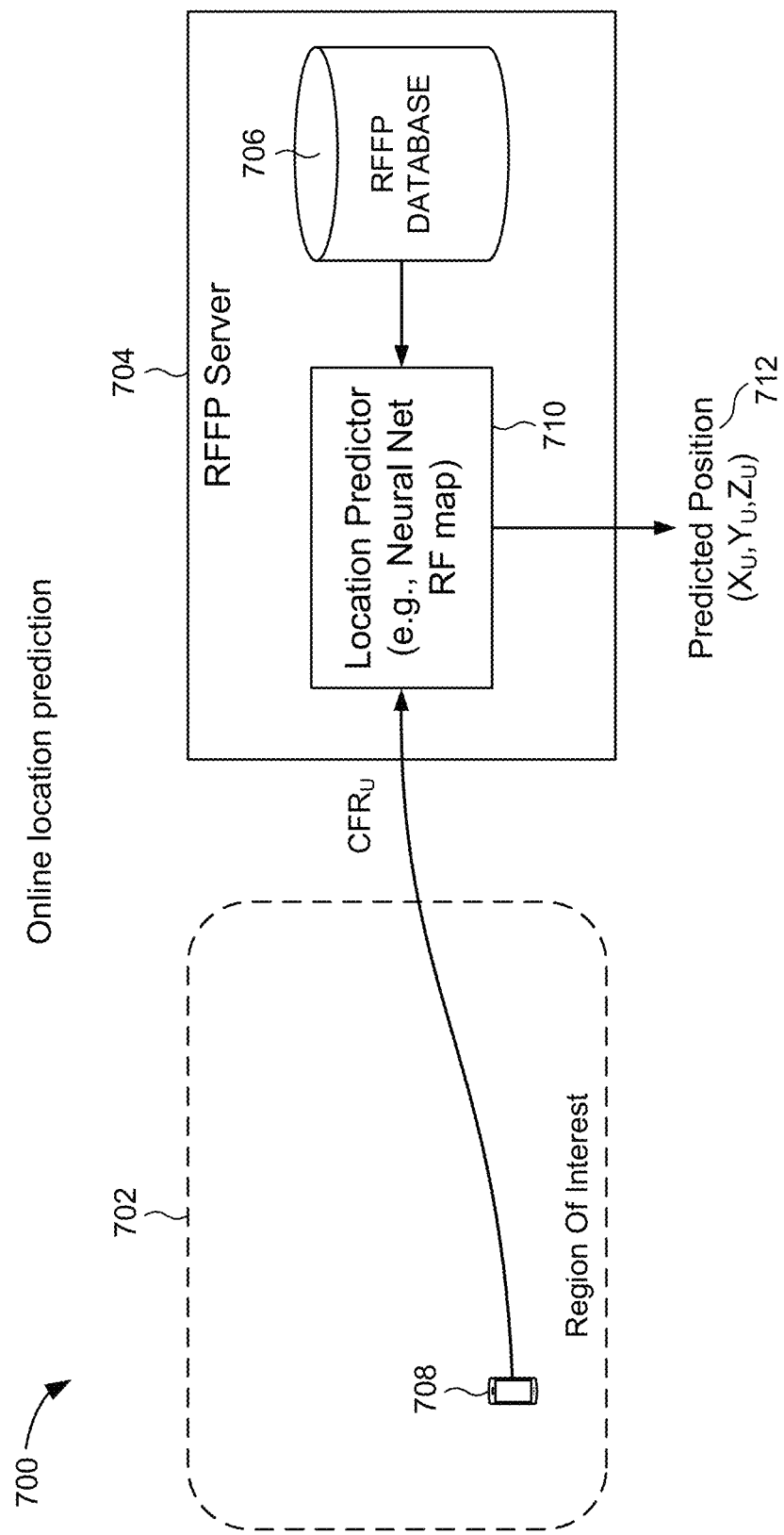

FIG. 7A and FIG. 7B illustrate portions of a conventional implementation of RFFP 700, in which measurements are taken from many ground truth locations, which are represented as stars in FIG. 7A and FIG. 7B, within a region of interest (ROI) 702. Data from each of those measurements is received by an RFFP server 704 and stored in an RFFP database 706. In the example shown in FIG. 7A, the data comprises a ground truth geographic location, represented as a (x,y,z) tuple, and a channel frequency response (CFR) of a signal that was transmitted from that geographic location.

As shown in FIG. 7B, the RFFP database 706 may then be used for a unique form of positioning in which a channel frequency response, labeled "$CFR_U$" in FIG. 7B, of a signal transmitted by a UE 708 whose exact position is to be determined is compared to entries ("fingerprints") in the RFFP database 706 to find a CFR in the database that best matches $CFR_U$. In FIG. 7B, for example, if an exact CFR match is found, the UE 708 can be presumed to be at the ground truth location associated with that database entry; if an exact CFR match is not found, the network may interpolate or extrapolate a location of the UE 708 from the ground truth locations of one or more entries in the RFFP database 706 that have channel measurements that are the closest to the channel measurement provided by the UE 708. In the example shown in FIG. 7B, a neural net 710 that has been trained using entries from the RFFP database 706 will accept $CFR_U$ as an input and will produce a predicted position 712 as an output. In other implementations, the $CFR_U$ may be used as a search parameter for entries within the RFFP database 706, with the matching entries produced by the database query being used as inputs into a weighted positioning algorithm or other type of algorithm.

In some aspects, the channel measurement associated with the UE whose position is to be determined may comprise an uplink (UL) sounding reference signal (SRS) or sidelink (SL) positioning reference signal (PRS) observation at each TRP, such as the channel impulse response. In some aspects, the channel measurement associated with the UE whose position is to be determined may comprise a measurement of a downlink (DL) PRS or SL PRS taken by the UE and reported to the network.

RFFP positioning is expected to be more accurate than conventional positioning algorithms, for a number of reasons, including, but not limited to, that spatial filtering and interpolation methods utilize multipath signals implicitly, and because RFFP can deal with challenging conditions, including having a limited number of base stations, and having only NLOS signals available.

However, conventional RFFP suffers the technical weakness that the channel between the BS and the UE is entirely a function of the environment. The network can only observe the channel; the network cannot control the channel, i.e., the channel is not configurable. If the network could control the channel, then many more datapoints could be collected for each ground truth location, e.g., a different datapoint for each different channel condition.

To address this technical difficulty, techniques for performing RFFP with the assistance of a RIS are herein presented.

Figure 8A:
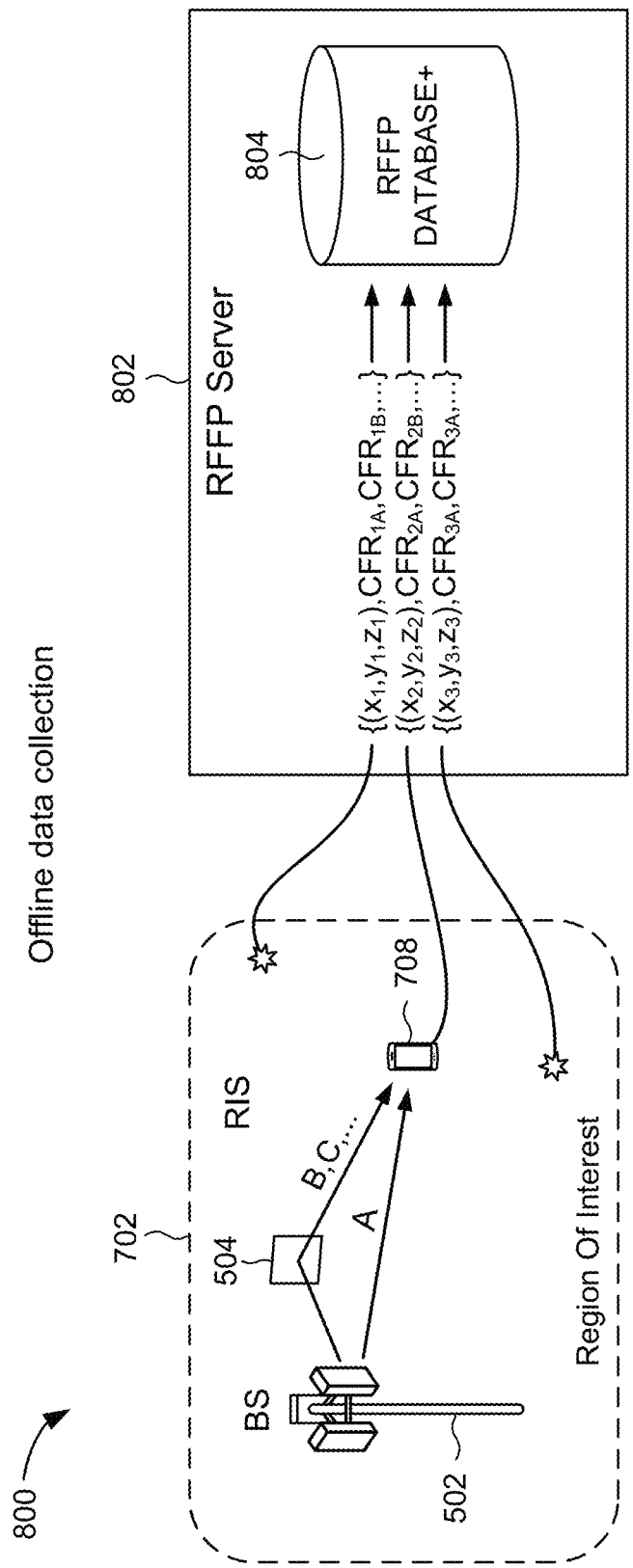
FIG. 8A and FIG. 8B illustrate portions of an example system for RIS-assisted RFFP for positioning, according to aspects of the disclosure.
Figure 8B:
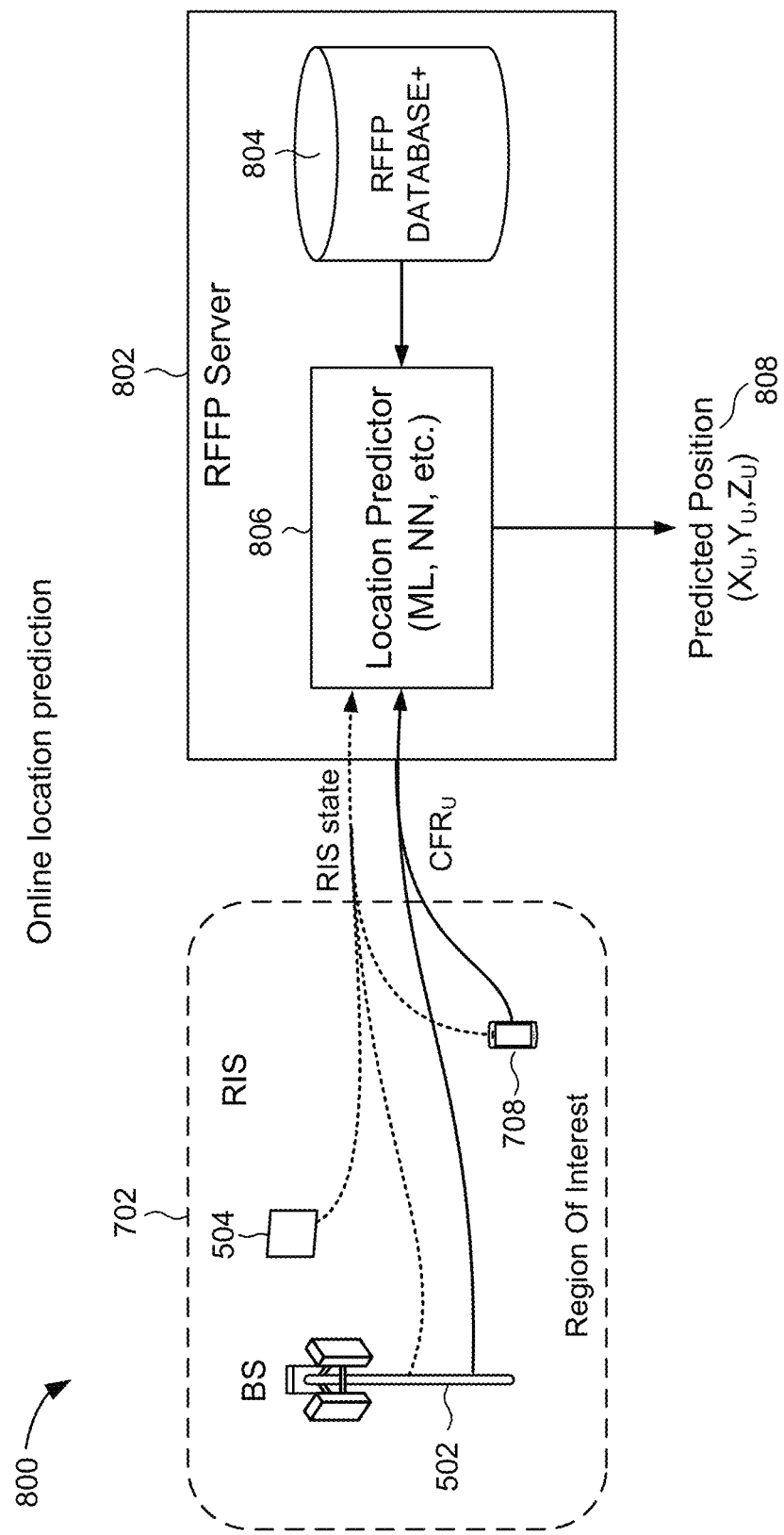

FIG. 8A and FIG. 8B illustrate portions of an example system 800 for RIS-assisted RFFP for positioning, according to aspects of the disclosure. In the example illustrated in FIG. 8A, a BS 502 and a RIS 504 exist within a ROI 702 in which a UE 708 is located. The BS 502, the RIS 504, the ROI 702, and the UE 708 are essentially identical to their like-numbered components in FIG. 5 and FIGS. 7A and 7B, respectively, and thus their descriptions will not be repeated here. System 800 includes a RFFP server 802 comprising an RFFP database 804.

With the RIS 504 present in the ROI 702, the channel can be modified due to the gains, delays and angle changes caused by operation of the RIS 504, the parameters of which may be prescribed by the RFFP server 802. Configuring the RIS 504 with different configurations can significantly change the observed channel at a given location, including, but not limited to, the locations $(x_1,y_1,z_1)$, $(x_2,y_2,z_2)$, and $(x_3,y_3,z_3)$ in FIG. 8A. This impacts RFFP training, by allowing multiple valid channel realizations to be obtained at the same location for various RIS configurations. As the number of RISs in the ROI 702 increases, the number of different channel conditions that can be measured also increases proportionally. The channel that results from the effects of the one or more RISs may be referred to as the composite channel.

In the example shown in FIG. 8A, if the RIS 504 is inactive, the channel that exists at the location currently occupied by the UE 708 may be a function of the LOS signal A from the BS 502. The channel frequency response (CFR) measured under these conditions is referred to in FIG. 8A as $CFR_{2A}$. If the RIS 504 is active, however, it may influence the channel condition in various ways, depending on the configuration of the RIS 504. The CFR measured under the various configurations of the RIS 504 is referred to in FIG. 8A as $CFR_{2B}$, $CFR_{2C}$, and so on.

Thus, for each location within the ROI 702, the geographic location (x,y,z) may be associated with not one CFR but multiple CFRs, representing the channel conditions with the RIS off and with the RIS on in various configurations. In FIG. 8, the RFFP database 804 contains multiple CFR values for each location. For example, for the location of the UE 708, which is $(x_2,y_2,z_2)$, the RFFP database 804 contains values $CFR_{2A}$, $CFR_{2B}$, etc.

Since conventional RFFP approaches do not involve the use of a RIS for assistance, there are currently no mechanisms defined by which an RFFP server, such as RFFP server 802, can coordinate with one or more RISes, such as RIS 504. Therefore, such mechanisms are provided herein.

In some aspects, the device measuring the composite downlink or composite uplink channel (e.g. the UE 708 or the BS 502 in FIG. 8) is aware of the current operating state of the RISs in the region of interest. For example, during offline data collection, for each geographic location at which the channel is measured, each RIS can be configured to cycle through many states (gain, delay, angle combinations), including the off or inactive state, and the RFFP server 802 records into the RFFP database 804 the channel state and RIS state together for all involved RISs, along with their physical locations and orientations. Examples of channel states include, but are not limited to, the channel impulse response, the channel frequency response, a histogram of received signal strength indicator (RSSI), etc. Where a RIS is operating in an amplify and forward mode, information about the channels between the RIS, UE, and BS for each BS location can also be provided to the RFFP server 802 for storage into the RFFP database 804. In some aspects, in addition to RFFPs of DL and UL channels, the states of the one or more RISes, as well as their locations and orientations, are provided as inputs to the machine language (ML) model. For example, this additional information may be provided to a neural network during training. The ML model may operate on direct channels, on composite channels, or on both. It is expected that the ML model will learn how the channel evolves as a function of the RIS state.

In some aspects, the RFFP server is unaware of the RIS state for each channel measurement. In this approach, for example, a neural network may be trained without knowledge of the underlying RIS state: e.g., different channels from the same location are provided to the RFFP server with the same location tag. It is expected that the ML model will be able to implicitly interpolate when it encounters a different channel from the same position due to different RFFP state.

In some aspects, to make the RFFP ML module robust, the RIS state can be changed sufficiently so that the full diversity of the end-of-end channel can be recorded by the RFFP server. For example, for a given incident angle $\theta_{in}$, if the output angle is in the range $[\theta_{out1}, \theta_{out2}]$ then the output angle range can be quantized to some #bins $[\theta_{o1}, \theta_{o2}, \ldots, \theta_{oN}]$ and for the channel recorded for each angle. The same process may be applied to change delays, gain states, or other parameters used by a RIS. In some aspects, for example, repetitions of PRS or SRS signals can be configured, and for each PRS or SRS transmission, the RIS state can be selected from this quantized set and the recorded channel. In some aspects, the amount of sampling of the RIS state is a function of the overhead that can be incurred, e.g., fine sampling of the RIS state can incur a higher overhead. If the channel observed by a UE is a function of multiple RISs, then the overhead can scale very quickly. In some aspects, the RIS state can be randomly sample from the state space and the channel state recorded for the provisioned overhead. In some aspects, to improve positioning, network can sweep S RIS states and let the positioning ML module generate multiple inferences for the same UE location. In some aspects, the final position can be calculated as the mathematical mean of all S inferences.

As shown in FIG. 8B, the RFFP database 804 may then be used for RIS-assisted RFFP positioning. In the example shown in FIG. 8B, the RFFP server 802 receives information characterizing a channel associated with the UE 708, which in this example is a channel frequency response, labeled "$CFR_U$". This information may be provided to the RFFP server 802 from the BS 502 or from the UE 708. $CFR_U$ or other information may be based, for example, on an UL signal, such as UL-SRS, a DL signal, such as DL-PRS, or some other signal from which channel characteristics may be derived.

Optionally, the RFFP server 802 may also receive information about the state of the RIS 504. This information may be provided by the RIS 504 directly, by the BS 502, e.g., if the BS 502 is controlling the state of the RIS 504, or by the UE 708, e.g., if the UE 708 is aware of the state of the RIS 504.

In the example shown in FIG. 8, a location predictor function 806 uses the channel information (and, if available, the RIS state information) to produce a predicted position 808. In some aspects, the channel information and optional RIS state information may be used to query the RFFP database 804 to find the best matching entry, the geographic location information from which is used to determine the predicted position 808. In some aspects, the RFFP database 804 is used to train a neural network or other ML model, which is takes as input the channel information and optional RIS state information and outputs the predicted position 808.

For a neural network implementation, the RFFP database 804 will have many more datapoints that may be used to train the neural net, because the RFFP database 804 will have not just one RF fingerprint per geographic location, it will have multiple RF fingerprints per geographic location due to the manipulation of the environment by an assisting RIS. This is true whether or not the RIS state is stored for each of the multiple measurements. Where the RIS state is stored for each measurement in the RFFP database 804, the RIS state can be another input into the neural net for training, but even if the RIS state is not stored for each measurement in the RFFP database 804, the neural net may be better trained than under conventional methods, simply as a result of having the additional datapoints that are available due to the varying RIS state.

Figure 9:
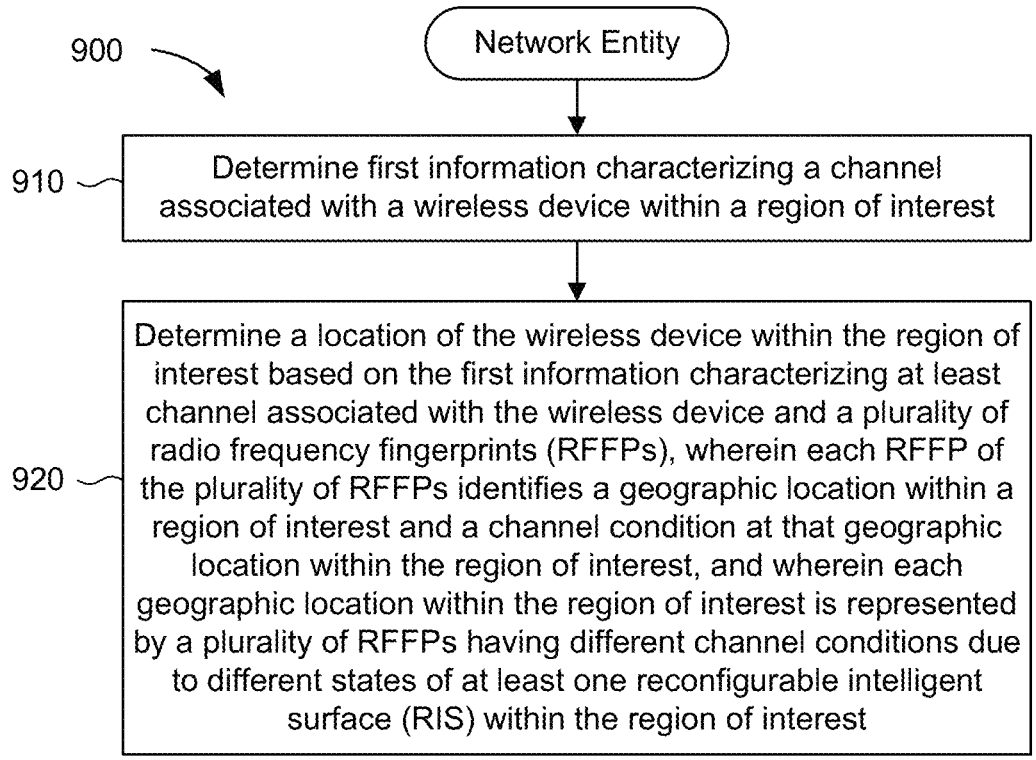
FIG. 9 is a flowchart of an example process, performed by a network entity, associated with RIS-assisted RFFP for positioning, according to aspects of the disclosure.

FIG. 9 is a flowchart of an example process 900 associated with RIS-assisted RFFP for positioning, according to aspects of the disclosure. In some implementations, one or more process blocks of FIG. 9 may be performed by a network entity (e.g., RFFP server 802). In some implementations, one or more process blocks of FIG. 9 may be performed by another device or a group of devices separate from or including the network entity. Additionally, or alternatively, one or more process blocks of FIG. 9 may be performed by one or more components of network entity 306, such as processor(s) 394, memory 396, network transceiver(s) 390, and positioning component(s) 398, any or all of which may be means for performing the operations of process 900.

As shown in FIG. 9, process 900 may include, at block 910, determining first information characterizing a channel associated with a wireless device within a region of interest. Means for performing the operation of block 910 may include the processor(s) 394, memory 396, or network transceiver(s) 390 of the network entity 306. For example, the first information may be received via the network transceiver(s) 390, e.g., from a base station that measured an UL signal, or from a UE that measured a DL signal.

In some aspects, determining the first information characterizing the channel associated with the wireless device within the region of interest comprises determining a characteristic of the channel based on measurement of an uplink signal transmitted from the wireless device. In some aspects, determining the first information characterizing the channel associated with the wireless device within the region of interest comprises receiving, form the wireless device, the first information characterizing the channel based on measurement, by the wireless device, of a downlink signal transmitted by a base station or a sidelink signal transmitted by another wireless device.

In some aspects, the first information characterizing the at least one channel associated with the wireless device comprises information characterizing a direct channel between the wireless device and a transmission/reception point (TRP), information characterizing a composite channel comprising a channel between the wireless device and one of the at least one RIS and a channel between the one of the at least one RIS and the TRP, or a combination thereof, where a TRP may comprise a base station, a gNB, or another UE, for example. In some aspects, each RFFP of the plurality of RFFPs further identifies a state of the at least one RIS within the region of interest. In some aspects, the first information characterizing the channel associated with the wireless device within the region of interest comprises a channel frequency response (CFR), a channel impulse response (CIR), a received signal strength indicator (RSSI) histogram, or a combination thereof.

As further shown in FIG. 9, process 900 may include, at block 920, determining a location of the wireless device within the region of interest based on the first information characterizing the at least one channel associated with the wireless device and a plurality of radio frequency fingerprints (RFFPs), wherein each RFFP of the plurality of RFFPs identifies a geographic location within a region of interest and a channel condition at that geographic location within the region of interest, and wherein each geographic location within the region of interest is represented by a plurality of RFFPs having different channel conditions due to different states of at least one reconfigurable intelligent surface (RIS) within the region of interest. Means for performing the operation of block 920 may include the processor(s) 394, memory 396, or network transceiver(s) 390 of the network entity 306.

In some aspects, determining the location of the wireless device within the region of interest based on the first information characterizing the at least one channel associated with the wireless device and the plurality of RFFPs comprises accessing a database of RFFPs maintained by the network entity, e.g., using a local bus if the database is local to the network entity or using the network transceiver(s) 390 if the database is remote from the network entity. In some aspects, the network entity maintains the database of RFFPs based on information provided to the network entity by a plurality of user equipment (UEs) via one or more base stations, the information comprising measurements taken at a plurality of locations within the region of interest and according to one or more RIS configurations per location. In some aspects, creating or maintaining the plurality of RFFPs comprises configuring one or more of the at least one RIS within the region of interest to operate in a plurality of different RIS states and to determine an RFFP at a given geographic location for each of the plurality of different RIS states. For example, the network entity 306 may use the network transceiver(s) 390 to configure one or more of the at least one RIS within the region of interest to operate in a plurality of different RIS states in order to determine an RFFP at a given geographic location for each of the plurality of different RIS states. In some aspects, the plurality of different RIS states comprise at least two of an inactive RIS state, a first active RIS state, and a second active RIS state different from the first active RIS state.

For example, in some aspects, determining the location of the wireless device within the region of interest based on the first information characterizing the channel associated with the wireless device and the plurality of RFFPs comprises using data from the plurality of RFFPs to train a machine learning (ML) model, providing, as an input to the ML model, the first information characterizing the channel associated with the wireless device, and receiving, as an output of the ML model, an estimated location of the wireless device within the region of interest. In some aspects, process 900 includes providing, as an additional input to the ML model, a state of at least one RIS within the region of interest at a time that the first information characterizing the channel associated with the wireless device was determined. In some aspects, using the data from the plurality of RFFPs to train the ML model comprises using the data from the plurality of RFFPs to train a neural network, and wherein providing the first information characterizing the channel associated with the wireless device as an input to the ML model comprises providing the first information characterizing the channel associated with the wireless device as an input to the neural network.

Process 900 may include additional implementations, such as any single implementation or any combination of implementations described below and/or in connection with one or more other processes described elsewhere herein. Although FIG. 9 shows example blocks of process 900, in some implementations, process 900 may include additional blocks, fewer blocks, different blocks, or differently arranged blocks than those depicted in FIG. 9. Additionally, or alternatively, two or more of the blocks of process 900 may be performed in parallel.

Figure 10:
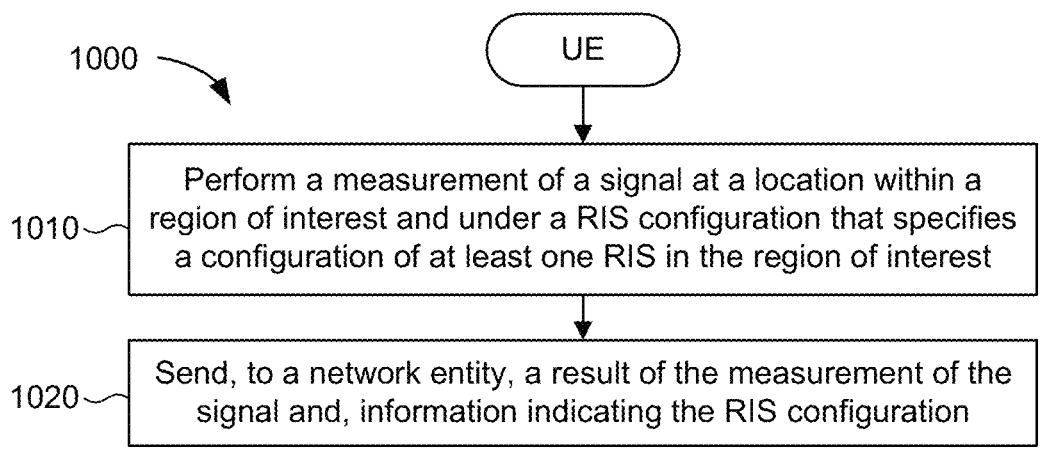
FIG. 10 is a flowchart of an example process, performed by a UE, associated with RIS-assisted RFFP for positioning, according to aspects of the disclosure.

FIG. 10 is a flowchart of an example process 1000 associated with RIS-assisted RFFP for positioning, according to aspects of the disclosure. In some implementations, one or more process blocks of FIG. 10 may be performed by a user equipment (UE) (e.g., UE 104). In some implementations, one or more process blocks of FIG. 10 may be performed by another device or a group of devices separate from or including the UE. Additionally, or alternatively, one or more process blocks of FIG. 10 may be performed by one or more components of UE 302, such as processor(s) 332, memory 340, WWAN transceiver(s) 310, short-range wireless transceiver(s) 320, satellite signal receiver 330, sensor(s) 344, user interface 346, and positioning component(s) 342, any or all of which may be means for performing the operations of process 1000.

As shown in FIG. 10, process 1000 may include, at block 1010, performing a measurement of a signal at a location within a region of interest and under a reconfigurable intelligent surface (RIS) configuration that specifies a configuration of at least one RIS in the region of interest. Means for performing the operation of block 1010 may include the processor(s) 332, memory 340, or WWAN transceiver(s) 310 of the UE 302. For example, the UE 302 may perform a measurement of a signal using the receiver(s) 312.

As further shown in FIG. 10, process 1000 may include, at block 1020, sending, to a network entity, measurement information, the measurement information comprising a result of the measurement of the signal and information indicating the RIS configuration. Means for performing the operation of block 1020 may include the processor(s) 332, memory 340, or WWAN transceiver(s) 310 of the UE 302. For example, the UE 302 may send the measurement information using the transmitter(s) 314. In some aspects, sending the measurement information to the network entity further comprises sending information indicating the location within the region of interest. In some aspects, sending the measurement information to the network entity comprises sending the measurement information to a location server.

Process 1000 may include additional implementations, such as any single implementation or any combination of implementations described below and/or in connection with one or more other processes described elsewhere herein. Although FIG. 10 shows example blocks of process 1000, in some implementations, process 1000 may include additional blocks, fewer blocks, different blocks, or differently arranged blocks than those depicted in FIG. 10. Additionally, or alternatively, two or more of the blocks of process 1000 may be performed in parallel.

Figure 11A:
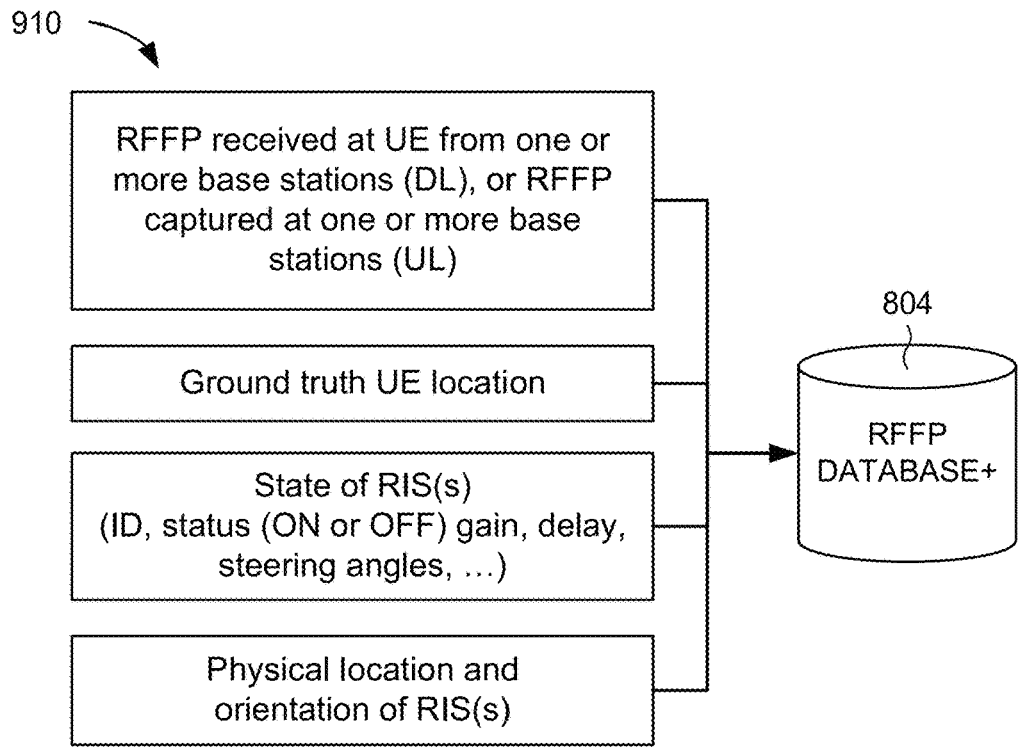
FIG. 11A and FIG. 11B illustrate in more detail aspects of an example process associated with RIS-assisted RFFP for positioning, according to aspects of the disclosure.
Figure 11B:
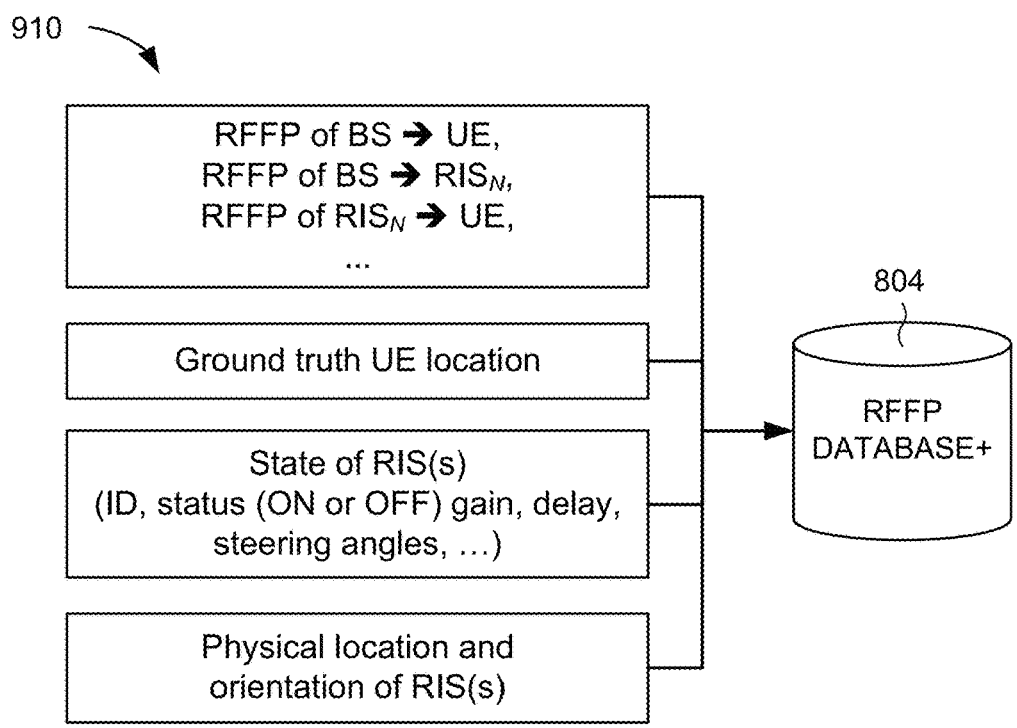

FIG. 11A and FIG. 11B illustrate in more detail two different implementations of the operation of block 910 of FIG. 9.

FIG. 11A illustrates example data that may be collected for direct measurements. In FIG. 11A, determining a plurality of RFFPs involves including the following information in the RFFP database 804: RFFPs received at a UE from one or more base stations (e.g., based on DL signals), or RFFPs captured at one or more base stations (e.g., based on UL signals); information about the ground truth locations of the UE; the state(s) of one or more RIS(s), such as the RIS ID, the RIS status (ON or OFF) at the time of channel capture, the RIS gain, delay, or steering angles, etc.; and the physical location and orientation of the RIS(s).

FIG. 11B illustrates example data that may be collected for composite measurements. In FIG. 11A, determining a plurality of RFFPs involves including the following information in the RFFP database 804: RFFPs for channels between a BS and a UE, RFFPs for channels between a BS and a RIS, and RFFPs for channels between a RIS and a UE; information about the ground truth locations of the UE; the state(s) of one or more RIS(s), such as the RIS ID, the RIS status (ON or OFF) at the time of channel capture, the RIS gain, delay, or steering angles, etc.; and the physical location and orientation of the RIS(s).

Figure 12A:
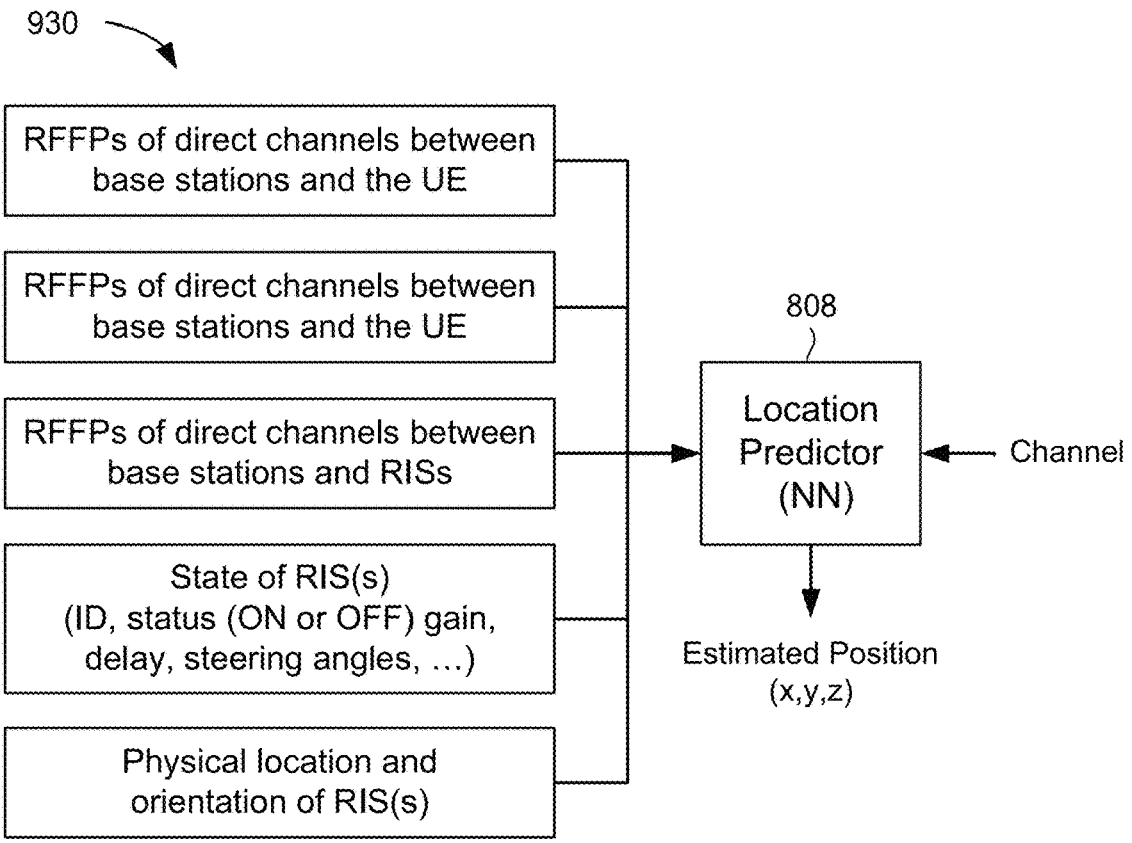
FIG. 12A, FIG. 12B, and FIG. 12C illustrate in more detail aspects of an example process associated with RIS-assisted RFFP for positioning, according to aspects of the disclosure.
Figure 12B:
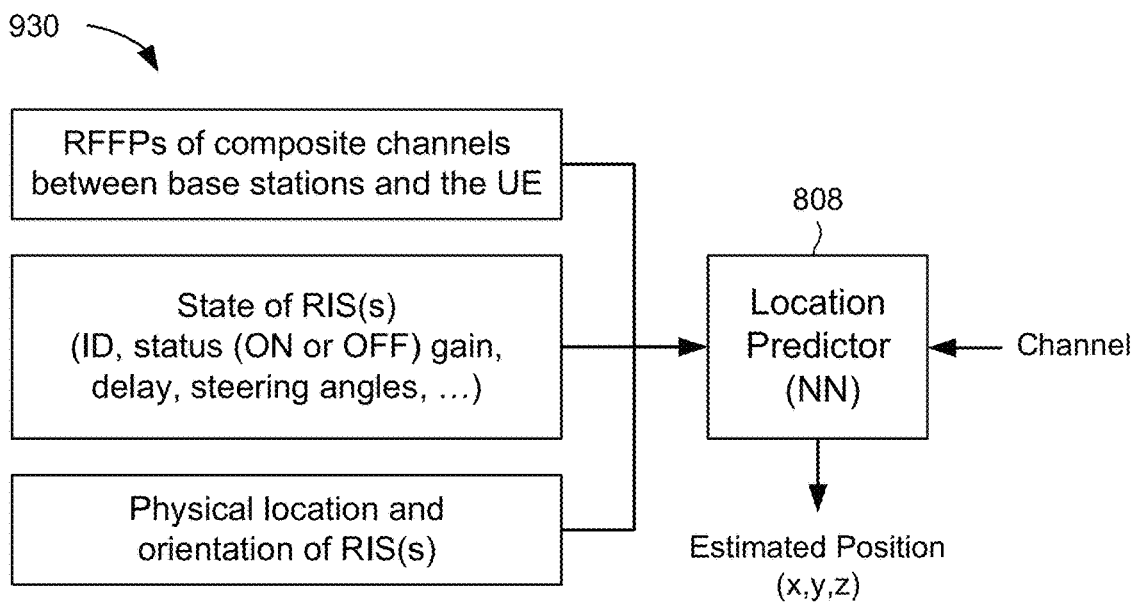
Figure 12C:
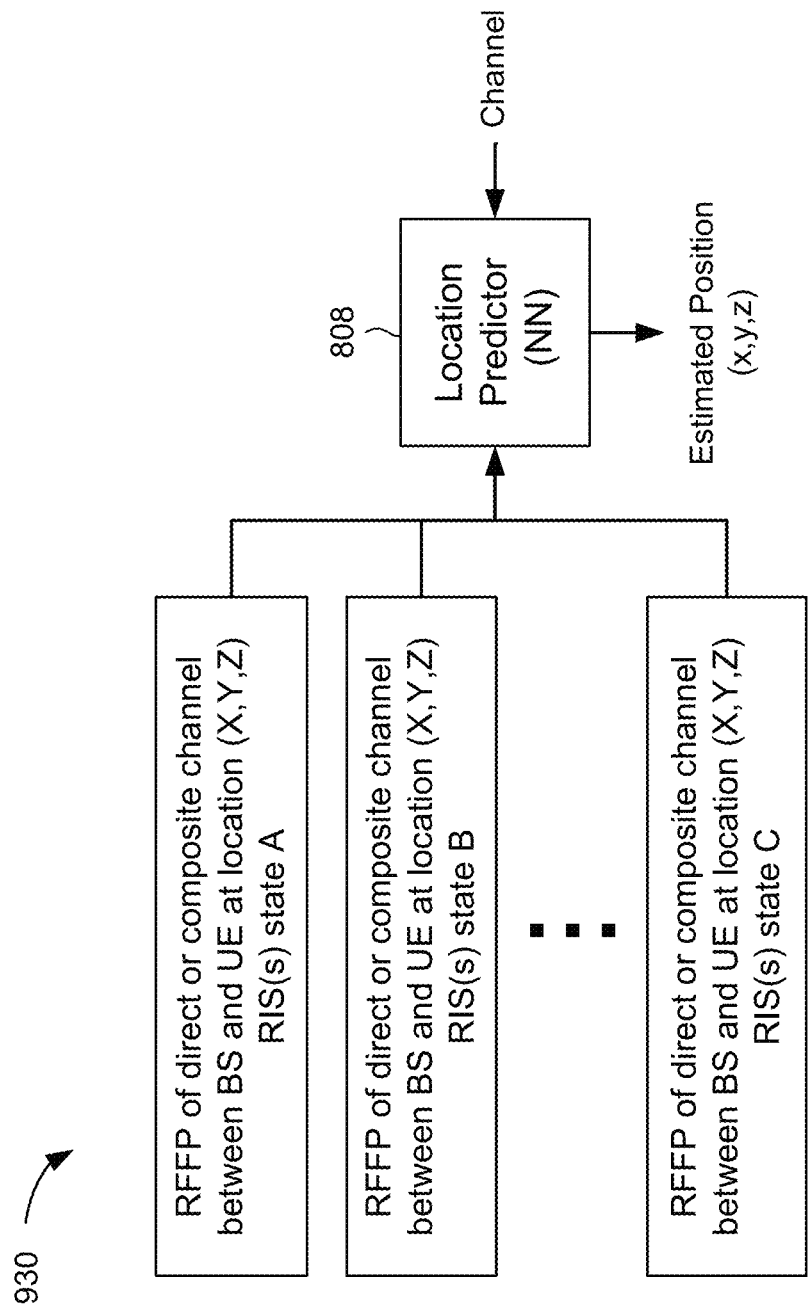

FIG. 12A, FIG. 12B, and FIG. 12C illustrate in more detail various aspects of the operation of block 930 of FIG. 9, and illustrate example data that may be used as inputs into a location predictor 806, such as a ML model or a neural network.

In FIG. 12A, determining a location of the wireless device within the region of interest may involve providing the following information to the location predictor 808: RFFPs for channels between base stations and the UE, RFFPs for channels between base stations and RISs, and RFFPs for channels between RISs and the UE; the state(s) of one or more RIS(s), such as the RIS ID, the RIS status (ON or OFF) at the time of channel capture, the RIS gain, delay, or steering angles, etc.; and the physical location and orientation of the RIS(s). The location predictor 806 also uses as input the channel associated with the UE whose position is to be determined, and outputs the estimated position of the UE.

In FIG. 12B, determining a location of the wireless device within the region of interest may involve providing the following information to the location predictor 808: RFFPs of composite channels between base stations and the UE; the state(s) of one or more RIS(s), such as the RIS ID, the RIS status (ON or OFF) at the time of channel capture, the RIS gain, delay, or steering angles, etc.; and the physical location and orientation of the RIS(s). The location predictor 806 also uses as input the channel associated with the UE whose position is to be determined, and outputs the estimated position of the UE.

FIG. 12C illustrates the point that for any particular location (X,Y,Z), there is more than one RFFP of a direct or composite channel between the BS and the UE at that location. In the example shown in FIG. 12C, the multiple RFFPs correspond to an RFFP at location (X,Y,Z) while the RIS was in a first state A, an RFFP at that location while the RIS was in a second state B, and an RFFP at that location while the RIS was in a third state C.

As will be appreciated, a technical advantage of the methods presented herein is that the use of one or more RISes allow the channel environment to be controlled somewhat, and that as a result the RFFP database has many more pieces of data from which to train a neural net or ML model or to use in some other fashion to perform RFFP for positioning.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A method of wireless positioning performed by a network entity, the method comprising: determining first information characterizing at least one channel associated with a wireless device within a region of interest; and determining a location of the wireless device within the region of interest based on the first information characterizing the at least one channel associated with the wireless device and a plurality of radio frequency fingerprints (RFFPs), wherein each RFFP of the plurality of RFFPs identifies a geographic location within a region of interest and a channel condition at that geographic location within the region of interest, and wherein each geographic location within the region of interest is represented by a plurality of RFFPs having different channel conditions due to different states of at least one reconfigurable intelligent surface (RIS) within the region of interest.

Clause 2. The method of clause 1, wherein determining the location of the wireless device within the region of interest based on the first information characterizing the at least one channel associated with the wireless device and the plurality of RFFPs comprises accessing a database of RFFPs maintained by the network entity.

Clause 3. The method of clause 2, further comprising maintaining the database of RFFPs based on information provided to the network entity by a plurality of user equipment (UEs), the information comprising measurements taken at a plurality of locations within the region of interest and according to one or more RIS configurations per location.

Clause 4. The method of any of clauses 1 to 3, further comprising configuring one or more of the at least one RIS within the region of interest to operate in a plurality of different RIS states and to determine an RFFP at a given geographic location for each of the plurality of different RIS states.

Clause 5. The method of clause 4, wherein the plurality of different RIS states comprise at least two of: an inactive RIS state; a first active RIS state; and a second active RIS state different from the first active RIS state.

Clause 6. The method of any of clauses 1 to 5, wherein the first information characterizing the at least one channel associated with the wireless device comprises: information characterizing a direct channel between the wireless device and a transmission/reception point (TRP); information characterizing a composite channel comprising a channel between the wireless device and one of the at least one RIS and a channel between the one of the at least one RIS and the TRP; or a combination thereof.

Clause 7. The method of any of clauses 1 to 6, wherein each RFFP of the plurality of RFFPs further identifies a state of the at least one RIS within the region of interest.

Clause 8. The method of any of clauses 1 to 7, wherein determining the first information characterizing the channel associated with the wireless device within the region of interest comprises determining a characteristic of the channel based on measurement of an uplink signal transmitted from the wireless device.

Clause 9. The method of any of clauses 1 to 8, wherein determining the first information characterizing the channel associated with the wireless device within the region of interest comprises receiving, form the wireless device, the first information characterizing the channel based on measurement, by the wireless device, of a downlink signal transmitted by a base station or a sidelink signal transmitted by another wireless device.

Clause 10. The method of any of clauses 1 to 9, wherein the first information characterizing the channel associated with the wireless device within the region of interest comprises a channel frequency response (CFR), a channel impulse response (CIR), a received signal strength indicator (RSSI) histogram, or a combination thereof.

Clause 11. The method of any of clauses 1 to 10, wherein determining the location of the wireless device within the region of interest based on the first information characterizing the channel associated with the wireless device and the plurality of RFFPs comprises: using data from the plurality of RFFPs to train a machine learning (ML) model; providing, as an input to the ML model, the first information characterizing the channel associated with the wireless device; and receiving, as an output of the ML model, an estimated location of the wireless device within the region of interest.

Clause 12. The method of clause 11, further comprising providing, as an additional input to the ML model, a state of at least one RIS within the region of interest at a time that the first information characterizing the channel associated with the wireless device was determined.

Clause 13. The method of any of clauses 11 to 12, wherein using the data from the plurality of RFFPs to train the ML model comprises using the data from the plurality of RFFPs to train a neural network, and wherein providing the first information characterizing the channel associated with the wireless device as an input to the ML model comprises providing the first information characterizing the channel associated with the wireless device as an input to the neural network.

Clause 14. A method of wireless positioning performed by a user equipment (UE), the method comprising: performing a measurement of a signal at a location within a region of interest and under a reconfigurable intelligent surface (RIS) configuration that specifies a configuration of at least one RIS in the region of interest; and sending, to a network entity, measurement information, the measurement information comprising a result of the measurement of the signal and information indicating the RIS configuration.

Clause 15. The method of clause 14, wherein sending the measurement information to the network entity further comprises sending information indicating the location within the region of interest.

Clause 16. The method of any of clauses 14 to 15, wherein sending the measurement information to the network entity comprises sending the measurement information to a location server.

Clause 17. A network entity, comprising: a memory; at least one transceiver; and at least one processor communicatively coupled to the memory and the at least one transceiver, the at least one processor configured to: determine first information characterizing at least one channel associated with a wireless device within a region of interest; and determine a location of the wireless device within the region of interest based on the first information characterizing the at least one channel associated with the wireless device and a plurality of radio frequency fingerprints (RFFPs), wherein each RFFP of the plurality of RFFPs identifies a geographic location within a region of interest and a channel condition at that geographic location within the region of interest, and wherein each geographic location within the region of interest is represented by a plurality of RFFPs having different channel conditions due to different states of at least one reconfigurable intelligent surface (RIS) within the region of interest.

Clause 18. The network entity of clause 17, wherein, to determine the location of the wireless device within the region of interest based on the first information characterizing the at least one channel associated with the wireless device and the plurality of RFFPs, the at least one processor is configured to access a database of RFFPs maintained by the network entity.

Clause 19. The network entity of clause 18, wherein the at least one processor configured to maintain the database of RFFPs based on information provided to the network entity by a plurality of user equipment (UEs), the information comprising measurements taken at a plurality of locations within the region of interest and according to one or more RIS configurations per location.

Clause 20. The network entity of any of clauses 17 to 19, wherein the at least one processor is further configured to configure one or more of the at least one RIS within the region of interest to operate in a plurality of different RIS states and to determine an RFFP at a given geographic location for each of the plurality of different RIS states.

Clause 21. The network entity of clause 20, wherein the plurality of different RIS states comprise at least two of: an inactive RIS state; a first active RIS state; and a second active RIS state different from the first active RIS state.

Clause 22. The network entity of any of clauses 17 to 21, wherein the first information characterizing the at least one channel associated with the wireless device comprises: information characterizing a direct channel between the wireless device and a transmission/reception point (TRP); information characterizing a composite channel comprising a channel between the wireless device and one of the at least one RIS and a channel between the one of the at least one RIS and the TRP; or a combination thereof.

Clause 23. The network entity of any of clauses 17 to 22, wherein each RFFP of the plurality of RFFPs further identifies a state of the at least one RIS within the region of interest.

Clause 24. The network entity of any of clauses 17 to 23, wherein, to determine the first information characterizing the channel associated with the wireless device within the region of interest, the at least one processor is configured to determine a characteristic of the channel based on measurement of an uplink signal transmitted from the wireless device.

Clause 25. The wireless device of any of clauses 17 to 24, wherein, to determine the first information characterizing the channel associated with the wireless device within the region of interest, the at least one processor is configured to receive, form the wireless device, the first information characterizing the channel based on measurement, by the wireless device, of a downlink signal transmitted by a base station or a sidelink signal transmitted by another wireless device.

Clause 26. The network entity of any of clauses 17 to 25, wherein the first information characterizing the channel associated with the wireless device within the region of interest comprises a channel frequency response (CFR), a channel impulse response (CIR), a received signal strength indicator (RSSI) histogram, or a combination thereof.

Clause 27. The network entity of any of clauses 17 to 26, wherein, to determine the location of the wireless device within the region of interest based on the first information characterizing the channel associated with the wireless device and the plurality of RFFPs, the at least one processor is configured to: use data from the plurality of RFFPs to train a machine learning (ML) model; provide, as an input to the ML model, the first information characterizing the channel associated with the wireless device; and receive, via the at least one transceiver, as an output of the ML model, an estimated location of the wireless device within the region of interest.

Clause 28. The network entity of clause 27, wherein the at least one processor is further configured to provide, as an additional input to the ML model, a state of at least one RIS within the region of interest at a time that the first information characterizing the channel associated with the wireless device was determined.

Clause 29. The network entity of any of clauses 27 to 28, wherein using the data from the plurality of RFFPs to train the ML model comprises using the data from the plurality of RFFPs to train a neural network, and wherein providing the first information characterizing the channel associated with the wireless device as an input to the ML model comprises providing the first information characterizing the channel associated with the wireless device as an input to the neural network.

Clause 30. A user equipment (UE), comprising: a memory; at least one transceiver; and at least one processor communicatively coupled to the memory and the at least one transceiver, the at least one processor configured to: perform a measurement of a signal at a location within a region of interest and under a reconfigurable intelligent surface (RIS) configuration that specifies a configuration of at least one RIS in the region of interest; and send, via the at least one transceiver, to a network entity, measurement information, the measurement information comprising a result of the measurement of the signal and information indicating the RIS configuration.

Clause 31. The UE of clause 30, wherein, to send the measurement information to the network entity, the at least one processor is configured to further send information indicating the location within the region of interest.

Clause 32. The UE of any of clauses 30 to 31, wherein, to send the measurement information to the network entity, the at least one processor is configured to send the measurement information to a location server.

Clause 33. An apparatus comprising a memory, a transceiver, and a processor communicatively coupled to the memory and the transceiver, the memory, the transceiver, and the processor configured to perform a method according to any of clauses 1 to 16.

Clause 34. An apparatus comprising means for performing a method according to any of clauses 1 to 16.

Clause 35. A non-transitory computer-readable medium storing computer-executable instructions, the computer-executable comprising at least one instruction for causing a computer or processor to perform a method according to any of clauses 1 to 16.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless positioning performed by a network entity, the method comprising:
determining first information characterizing at least one channel associated with a wireless device within a region of interest; and
determining a location of the wireless device within the region of interest based on the first information characterizing the at least one channel associated with the wireless device and a plurality of radio frequency fingerprints (RFFPs),
wherein each RFFP of the plurality of RFFPs identifies a geographic location within a region of interest and a channel condition at that geographic location within the region of interest,
wherein each geographic location within the region of interest is represented by a plurality of RFFPs having different channel conditions due to different states of at least one reconfigurable intelligent surface (RIS) within the region of interest, and
wherein the different states of the at least one RIS comprise an inactive state and a first active state.

2. The method of claim 1, wherein determining the location of the wireless device within the region of interest based on the first information characterizing the at least one channel associated with the wireless device and the plurality of RFFPs comprises accessing a database of RFFPs maintained by the network entity.

3. The method of claim 2, further comprising: maintaining the database of RFFPs based on information provided to the network entity by a plurality of user equipment (UEs), the information comprising measurements taken at a plurality of locations within the region of interest and according to one or more RIS configurations per location.

4. The method of claim 1, further comprising: configuring one or more of the at least one RIS within the region of interest to operate in a plurality of different RIS states and to determine an RFFP at a given geographic location for each of the plurality of different RIS states.

5. The method of claim 4, wherein the plurality of different RIS states further comprises a second active RIS state different from the first active RIS state.

6. The method of claim 1, wherein the first information characterizing the at least one channel associated with the wireless device comprises:
information characterizing a direct channel between the wireless device and a transmission/reception point (TRP);
information characterizing a composite channel comprising a channel between the wireless device and one of the at least one RIS and a channel between the one of the at least one RIS and the TRP; or
a combination thereof.

7. The method of claim 1, wherein each RFFP of the plurality of RFFPs further identifies a state of the at least one RIS within the region of interest.

8. The method of claim 1, wherein determining the first information characterizing the channel associated with the wireless device within the region of interest comprises determining a characteristic of the channel based on measurement of an uplink signal transmitted from the wireless device.

9. The method of claim 1, wherein determining the first information characterizing the channel associated with the wireless device within the region of interest comprises receiving, form the wireless device, the first information characterizing the channel based on measurement, by the wireless device, of a downlink signal transmitted by a base station or a sidelink signal transmitted by another wireless device.

10. The method of claim 1, wherein the first information characterizing the channel associated with the wireless device within the region of interest comprises a channel frequency response (CFR), a channel impulse response (CIR), a received signal strength indicator (RSSI) histogram, or a combination thereof.

11. The method of claim 1, wherein determining the location of the wireless device within the region of interest based on the first information characterizing the channel associated with the wireless device and the plurality of RFFPs comprises:
using data from the plurality of RFFPs to train a machine learning (ML) model;
providing, as an input to the ML model, the first information characterizing the channel associated with the wireless device; and
receiving, as an output of the ML model, an estimated location of the wireless device within the region of interest.

12. The method of claim 11, further comprising providing, as an additional input to the ML model, a state of at least one RIS within the region of interest at a time that the first information characterizing the channel associated with the wireless device was determined.

13. The method of claim 11, wherein using the data from the plurality of RFFPs to train the ML model comprises using the data from the plurality of RFFPs to train a neural network, and wherein providing the first information characterizing the channel associated with the wireless device as an input to the ML model comprises providing the first information characterizing the channel associated with the wireless device as an input to the neural network.

14. A method of wireless positioning performed by a user equipment (UE), the method comprising:
performing a measurement of a signal at a location within a region of interest and under a reconfigurable intelligent surface (RIS) configuration that specifies a configuration of at least one RIS in the region of interest; and
sending, to a network entity, measurement information, the measurement information comprising a result of the measurement of the signal and information indicating the RIS configuration.

15. The method of claim 14, wherein sending the measurement information to the network entity further comprises sending information indicating the location within the region of interest.

16. The method of claim 14, wherein sending the measurement information to the network entity comprises sending the measurement information to a location server.

17. A network entity, comprising:
a memory;
at least one transceiver; and
at least one processor communicatively coupled to the memory and the at least one transceiver, the at least one processor configured to:
determine first information characterizing at least one channel associated with a wireless device within a region of interest; and
determine a location of the wireless device within the region of interest based on the first information characterizing the at least one channel associated with the wireless device and a plurality of radio frequency fingerprints (RFFPs),
   wherein each RFFP of the plurality of RFFPs identifies a geographic location within a region of interest and a channel condition at that geographic location within the region of interest,
   wherein each geographic location within the region of interest is represented by a plurality of RFFPs having different channel conditions due to different states of at least one reconfigurable intelligent surface (RIS) within the region of interest, and
   wherein the different states of the at least one RIS comprise an inactive state and a first active state.

18. The network entity of claim 17, wherein, to determine the location of the wireless device within the region of interest based on the first information characterizing the at least one channel associated with the wireless device and the plurality of RFFPs, the at least one processor is configured to access a database of RFFPs maintained by the network entity.

19. The network entity of claim 18, wherein the at least one processor is configured to maintain the database of RFFPs based on information provided to the network entity by a plurality of user equipment (UEs), the information comprising measurements taken at a plurality of locations within the region of interest and according to one or more RIS configurations per location.

20. The network entity of claim 17, wherein the at least one processor is further configured to configure one or more of the at least one RIS within the region of interest to operate in a plurality of different RIS states and to determine an RFFP at a given geographic location for each of the plurality of different RIS states.

21. The network entity of claim 20, wherein the plurality of different RIS states further comprises a second active RIS state different from the first active RIS state.

22. The network entity of claim 17, wherein the first information characterizing the at least one channel associated with the wireless device comprises:
   information characterizing a direct channel between the wireless device and a transmission/reception point (TRP);
   information characterizing a composite channel comprising a channel between the wireless device and one of the at least one RIS and a channel between the one of the at least one RIS and the TRP; or
   a combination thereof.

23. The network entity of claim 17, wherein each RFFP of the plurality of RFFPs further identifies a state of the at least one RIS within the region of interest.

24. The network entity of claim 17, wherein, to determine the first information characterizing the channel associated with the wireless device within the region of interest, the at least one processor is configured to determine a characteristic of the channel based on measurement of an uplink signal transmitted from the wireless device.

25. The wireless device of claim 17, wherein, to determine the first information characterizing the channel associated with the wireless device within the region of interest, the at least one processor is configured to receive, form the wireless device, the first information characterizing the channel based on measurement, by the wireless device, of a downlink signal transmitted by a base station or a sidelink signal transmitted by another wireless device.

26. The network entity of claim 17, wherein the first information characterizing the channel associated with the wireless device within the region of interest comprises a channel frequency response (CFR), a channel impulse response (CIR), a received signal strength indicator (RSSI) histogram, or a combination thereof.

27. The network entity of claim 17, wherein, to determine the location of the wireless device within the region of interest based on the first information characterizing the channel associated with the wireless device and the plurality of RFFPs, the at least one processor is configured to:
   use data from the plurality of RFFPs to train a machine learning (ML) model;
   provide, as an input to the ML model, the first information characterizing the channel associated with the wireless device; and
   receive, via the at least one transceiver, as an output of the ML model, an estimated location of the wireless device within the region of interest.

28. The network entity of claim 27, wherein the at least one processor is further configured to provide, as an additional input to the ML model, a state of at least one RIS within the region of interest at a time that the first information characterizing the channel associated with the wireless device was determined.

29. The network entity of claim 27, wherein using the data from the plurality of RFFPs to train the ML model comprises using the data from the plurality of RFFPs to train a neural network, and wherein providing the first information characterizing the channel associated with the wireless device as an input to the ML model comprises providing the first information characterizing the channel associated with the wireless device as an input to the neural network.

30. A user equipment (UE), comprising:
   a memory;
   at least one transceiver; and
   at least one processor communicatively coupled to the memory and the at least one transceiver, the at least one processor configured to:
      perform a measurement of a signal at a location within a region of interest and under a reconfigurable intelligent surface (RIS) configuration that specifies a configuration of at least one RIS in the region of interest; and
      send, via the at least one transceiver, to a network entity, measurement information, the measurement information comprising a result of the measurement of the signal and information indicating the RIS configuration.

31. The UE of claim 30, wherein, to send the measurement information to the network entity, the at least one processor is configured to further send information indicating the location within the region of interest.

32. The UE of claim 30, wherein, to send the measurement information to the network entity, the at least one processor is configured to send the measurement information to a location server.

* * * * *